United States Patent [19]
Cruz et al.

[11] Patent Number: 5,594,911
[45] Date of Patent: Jan. 14, 1997

[54] SYSTEM AND METHOD FOR PREPROCESSING AND DELIVERING MULTIMEDIA PRESENTATIONS

[75] Inventors: Gil C. Cruz, Annandale; Ralph D. Hill, Randolph; Thomas H. Judd, Madison; Darren H. New, Highland Park; Jonathan Rosenberg, Annandale, all of N.J.

[73] Assignee: Bell Communications Research, Inc., Morristown, N.J.

[21] Appl. No.: 274,502

[22] Filed: Jul. 13, 1994

[51] Int. Cl.$^6$ ................................................ G06F 15/00
[52] U.S. Cl. ............... 395/800; 395/806; 364/232.93; 364/242.94; 364/271.5; 364/281.8; 364/284.4; 364/DIG. 1
[58] Field of Search .................... 395/800, 550, 395/650, 200.15, 827, 840, 858, 497.01, 161–153, 700–726

[56] References Cited

U.S. PATENT DOCUMENTS

| | | | |
|---|---|---|---|
| 5,119,188 | 6/1992 | McCalley et al. | 358/86 |
| 5,265,248 | 11/1993 | Moulious et al. | 395/650 |
| 5,420,572 | 5/1995 | Dolin, Jr. et al. | 340/825.22 |
| 5,420,801 | 5/1995 | Dockter et al. | 364/514 R |
| 5,438,658 | 8/1995 | Fitzpatrick et al. | 395/153 |

OTHER PUBLICATIONS

"Multimedia Delivery Over Public Switched Networks," Jonathan Rosenberg, The Bellcore Exchange, Jan./Feb. 1993.

"Requirements for Network Delivery of Stored Interactive Multimedia," Darren New, Jonathan Rosenberg, Gil Cruz and Thomas Judd, 3rd International Workshop on Network and Operating System Support for Digital Audio and Video, San Diego, CA, Nov. 1992.

"Real–Time Electronic Publishing: Network Delivery of Multimedia Documents," Gil Cruz, Tom Judd, Darren New and Jonathan Rosenberg, Proceedings of EDD '92: a Vehicle for Change, Parsippany, NJ, Oct. 1992.

"Multimedia Communications for Users," Jonathan Rosenberg, Robert Kraut, Louis Gomez and C. Alan Buzzard, IEEE Communications 30(5), May 1992. Special Issue on Multimedia Communications.

*Primary Examiner*—Alpesh M. Shah
*Attorney, Agent, or Firm*—Leonard Charles Suchyta; Loria B. Yeadon

[57] ABSTRACT

A system and method for preprocessing and delivering multimedia presentations to customers such that delays due to interactive response time is virtually eliminated include a preprocessor, mass storage, a delivery processor, a distribution network, and a plurality of presentation processors. The preprocessor receives as inputs an original multimedia presentation and parameters characterizing other system components, which parameters include the round trip latency between the delivery processor and a presentation processor, and generates a preprocessed multimedia presentation including a delivery schedule in the form of a labelled, directed graph. In generating the delivery schedule, the preprocessor ensures that each object of the presentation and its associated presentation command arrive at the presentation processor no later than its presentation time; objects and commands which are delivered to the presentation processor can be accommodated at the memory of the presentation processor; and those objects to be presented immediately in response to a customer's selection of an interactive feature are received at the presentation processor prior to their earliest presentation times. This delivery schedule contains delivery commands which are executed by the delivery processor for transmitting objects of the presentation and their associated presentation commands to the presentation processor, which executes the presentation commands and presents the objects to its corresponding customer.

10 Claims, 15 Drawing Sheets

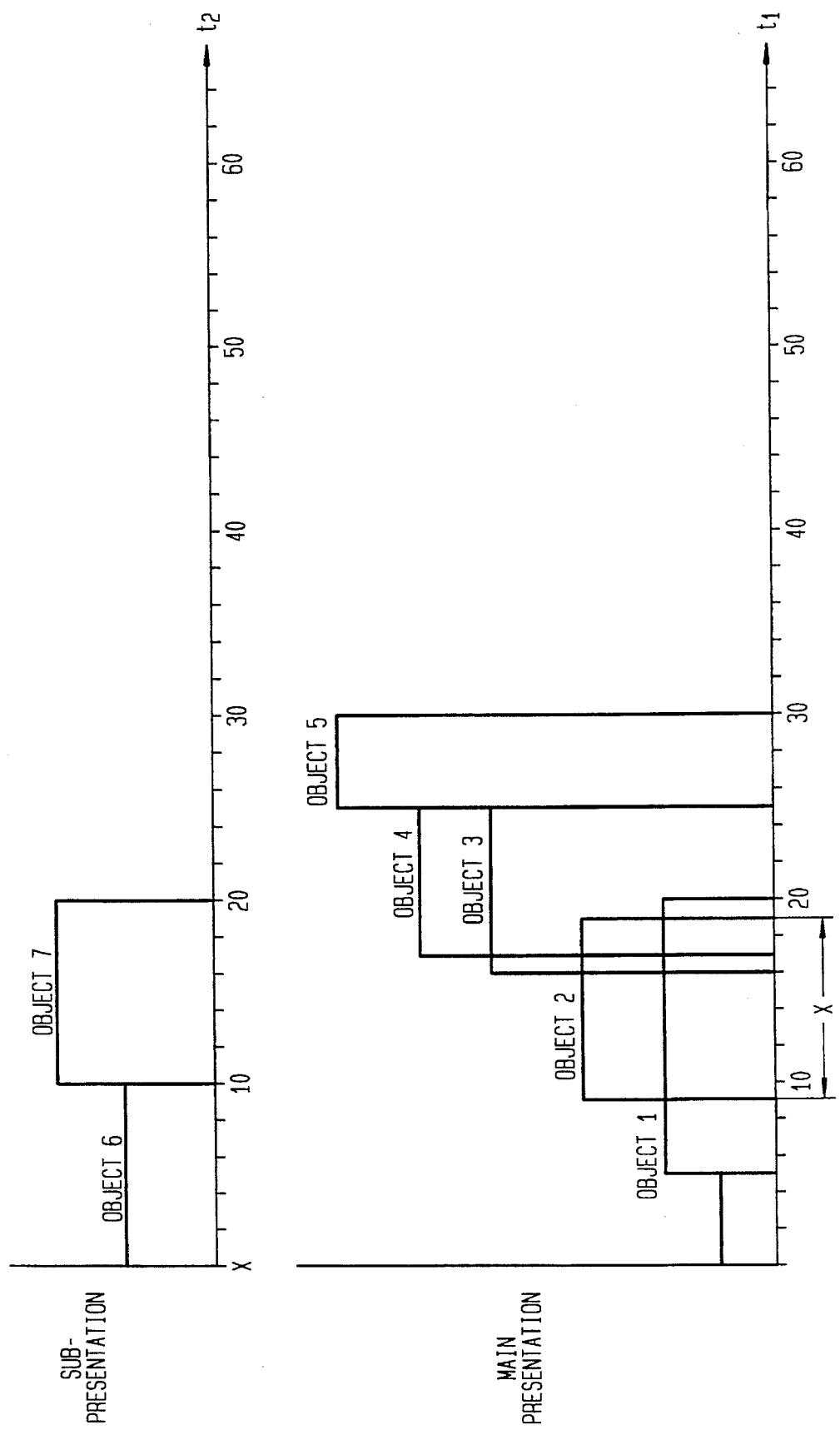

FIG. 1B
ILLUSTRATIVE ORIGINAL MULTIMEDIA PRESENTATION

| OBJECT NUMBER | OBJECT DESCRIPTION | OBJECT TYPE | OBJECT SIZE (BYTES) | PRESENTATION TIMES (SEC) | | CLOCK |
|---|---|---|---|---|---|---|
| | | | | START | END | |
| 1 | IMAGE | IMAGE | 50K | 5 | 20 | 1 |
| 2 | SIDEBAR ICON | GRAPHIC | 75 | 9 | 19 | 1 |
| 3 | IMAGE | IMAGE | 50K | 16 | 25 | 1 |
| 4 | IMAGE | IMAGE | 100K | 17 | 25 | 1 |
| 5 | IMAGE | IMAGE | 50K | 25 | 30 | 1 |
| 6 | SIDEBAR IMAGE | IMAGE | 50K | 0 | 10 | 2 |
| 7 | SIDEBAR IMAGE | IMAGE | 100K | 10 | 20 | 2 |

FIG. 1D
ILLUSTRATIVE INTERACTION TABLE OF ORIGINAL MULTIMEDIA PRESENTATION

| ENABLE TIME | DISABLE INTERACTION TIME | INTERACTION CLOCK | JUMP EVENT DESCRIPTION | CLOCK |
|---|---|---|---|---|
| 9 | 19 | 1 | CUSTOMER PUSHES BUTTON | 2 |

FIG. 1E
DELIVERY TIMES OF ORIGINAL MULTIMEDIA PRESENTATION

| OBJECT | DELIVERY TIMES (SEC) | | AVAILABLE MEMORY (KBYTES) |
|---|---|---|---|
| | START | END | |
| 1 | 0.0 | 3.1 | 200 |
| 2 | 3.1 | 3.1 | 200 |
| 3 | 3.1 | 6.3 | 150 |
| 4 | 6.3 | 12.5 | 50 |
| 5 | 12.5 | 15.6 | 0 |
| 6 | 21.0 | 24.1 | 200 |
| 7 | 24.1 | 30.4 | 100 |

DELIVERY PROCESSOR

PRESENTATION PROCESSOR

DELIVERY TIMES OF PREPROCESSED MULTIMEDIA PRESENTATION

| OBJECT | NODE | DELIVERY TIMES, $t_1$, ON CLOCK 1 (SEC) | | AVAILABLE MEMORY (KBYTES) |
|---|---|---|---|---|
| | | START | END | |
| 1 | 1 | 0.0 | 3.1 | 200 |
| 2 | 2 | 3.1 | 3.1 | 200 |
| 6 | 3 | 3.1 | 6.2 | 150 |
| 3 | 4 | 6.2 | 9.3 | 100 |
| 4 | 6 | 9.3 | 15.6 | 0 |
| 5 | 7 | 21.0 | 24.1 | 100 |
| 7 | 5 | 0* | 6.3* | 100 |

* DELIVERY TIMES, $t_2$, ON CLOCK 2

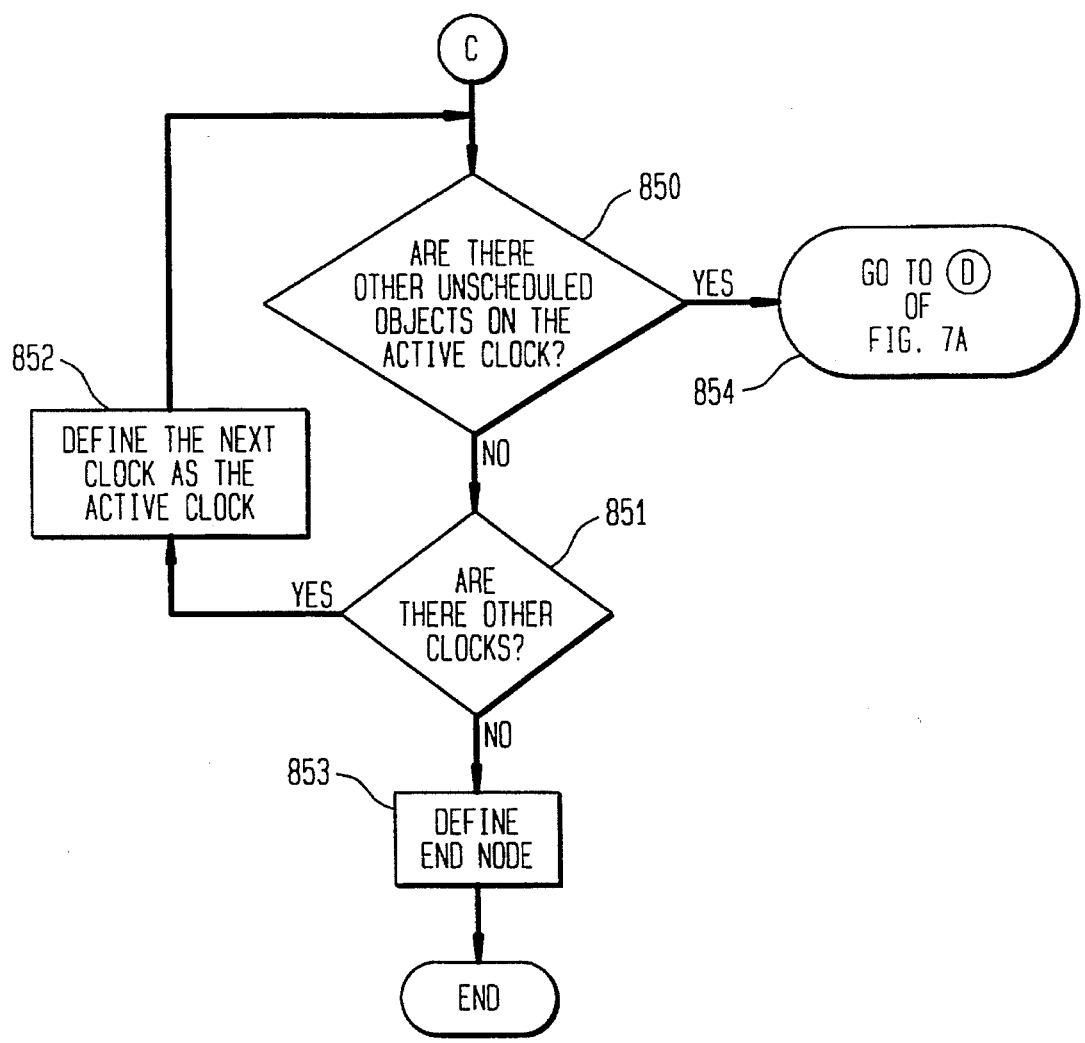

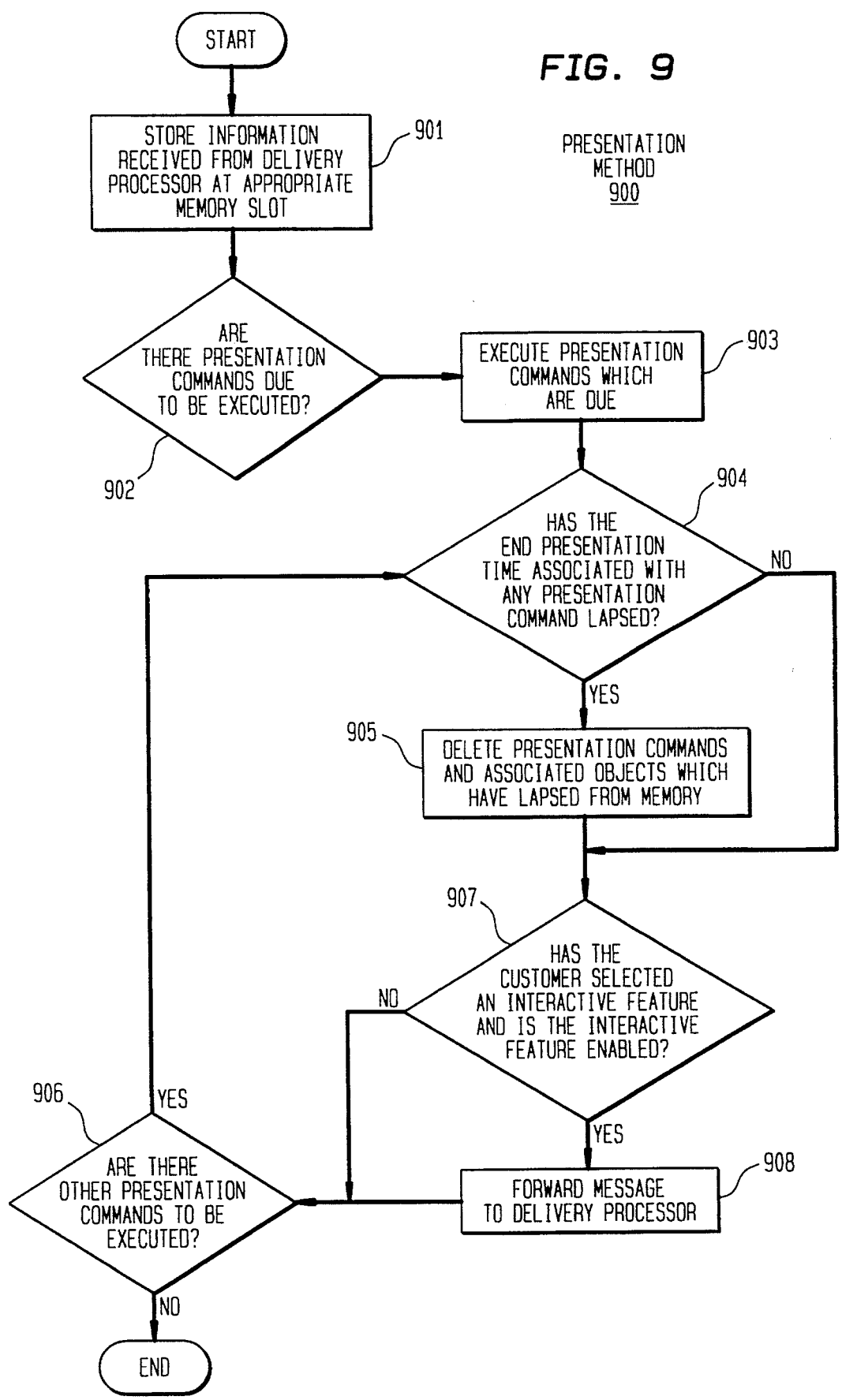

SYSTEM AND METHOD FOR PREPROCESSING AND DELIVERING MULTIMEDIA PRESENTATIONS

RELATED APPLICATIONS AND PATENTS

U.S. patent application Ser. No. 08/274,503, entitled *Apparatus and Method for Preprocessing Multimedia Presentations,* and filed on Jul. 13, 1994 concurrently with, and for the same inventors of, the present application, pending U.S. patent application Ser. No. 08/143,007, entitled *Apparatus and Method for Predicting Subjective Quality of Compressed Images* and filed on Oct. 26, 1993 for T. H. Judd, and pending U.S. patent applications Ser. No. 07/884,516, entitled *Communications Architecture and Method of Distributing Information Services,* which issued on Dec. 9, 1994 and U.S. Pat. No. 5,371,532, and Ser. No. 07/884,515, entitled *Communications Architecture and Buffer for Distributing Information Services,* which issued on Aug. 23, 1994 as U.S. Pat. No. 5,341,474, both for A. D. Gelman, H. Kobrinski, L. S. Smoot, and S. B. Weinstein, all of which are assigned to the assignee hereof, contain subject matter related to that of the present application.

FIELD OF THE INVENTION

This invention relates to a method and system for preprocessing and delivering multimedia presentations.

BACKGROUND OF THE INVENTION

Multimedia information is a combination of different types of information (e.g., still images, text, graphics, audio, and motion video) integrated into a single presentation. The growing market for multimedia presentations has stimulated interest in efficient and cost-effective mechanisms for delivering multimedia presentations from providers to customers.

Some prior delivery schemes provide real-time delivery of multimedia presentations from an information warehouse, where multimedia presentations of one or more providers are stored, to multiple customers. Illustratively, FIG. 1A depicts a prior delivery system 10 which includes an information warehouse 20, a distribution network 30, and a plurality of customer premises equipments (CPEs) 40-1 through 40-K corresponding to customers 41-1 through 41-K, respectively. The information warehouse 20 includes mass storage 21, where multimedia presentations are stored, and a server 22, which retrieves multimedia presentations from storage 21 and delivers these presentations to the CPEs of requesting customers.

The multimedia presentation includes objects which contain the images, text, graphics, or other information to be presented to the customer. On receiving a customer's request for a multimedia presentation, the server sends to the customer's CPE, a script corresponding to the multimedia presentation, which script contains instructions for retrieving the objects from the server and presenting the objects to the customer. The CPE then plays out the presentation to the customer as instructed in the script along a main presentation path and sends requests for objects of the presentation to the server 22 as needed. On receiving a request from a customer for a multimedia object, the server delivers the object to the customer's CPE as requested as quickly as possible, thereby operating in a reactive mode in delivering objects to the CPE. This reactive mode of operation between the server and the CPE characterizes the conventional client-server model.

At times during the presentation, the customer may have the opportunity to select interactive features. Such features may include moving to another screen of information or selecting the display of a sidebar. Should the customer select an interactive feature, the customer's CPE sends a request to the server for the appropriate objects of the presentation to be played out in response to the customer's selection. The server reacts by sending the requested objects of the presentation as quickly as possible to the CPE. The CPE switches from presenting the multimedia presentation along the main presentation path to presenting the multimedia presentation along a sub-presentation path corresponding to the selected interactive feature.

For purposes of illustrating the shortcomings of a reactive mode of operation characterizing prior multimedia delivery systems, FIGS. 1B and 1C depict a table and graph, respectively, of objects representing an original multimedia presentation (OMP). An OMP is used to clearly specify the behavior of a multimedia presentation. In FIG. 1B, each row corresponds to an object and the column entries represent the following:

Object Number: a unique identifier for each object.

Object Description: a comment (meant for the reader) that describes the object's purpose. The Object Description is for illustrative purposes only and would not be part of an OMP in practice.

Object Type: the medium contained in the object.

Object Size: the size of the object in bytes.

Presentation Times: the time at which the presentation of the object is to begin (Start) and the time at which the presentation of the object is to end (End). For visible images, the End Time is the time at which the object will be removed from the display. For audio objects, the End Time is the time at which the audio will no longer be audible to the customer.

Clock: the logical clock used to base this object's Start and End Times. Logical clocks are used to represent alternative paths through the presentation (paths being chosen as a result of an interactive feature). By convention, the presentation begins on Clock 1. In this example, Clock 2 represents the only alternative sub-presentation path in this presentation.

The OMP of FIGS. 1B and 1C is simplified and may not be exemplary of typical multimedia presentations. However, this illustrative presentation serves our purposes of presenting an easy-to-understand example. As shown in FIGS. 1B and 1C, our illustrative multimedia presentation comprises a main presentation which includes Objects 1 through 5 and a sub-presentation which includes Objects 6 and 7. The objects of the main presentation have presentation times based on Clock 1, and the objects of the sub-presentation have presentation times based on Clock 2.

As shown in FIGS. 1B and 1C, the OMP begins along the main presentation path and the active presentation clock is Clock 1. After a 5-second delay, the image of Object 1 is presented at $t_1=5$ seconds, and this image remains visible until $t_1=20$ seconds. Object 2, a sidebar icon, appears 9 seconds into the main presentation indicating to the customer that there is additional, optional information that may be viewed by choosing the sidebar interactive feature. The icon of Object 2 remains for 10 seconds until $t_1=19$ seconds. FIG. 1D depicts an interaction table for the OMP which shows that the interactive feature is enabled during the 10 second interval from $t_1=9$ seconds to $t_1=19$ seconds, and disabled at all other times. Each row of the interaction table corresponds to an interactive feature, and the meaning of the column entries in FIG. 1D are as follows:

Enable Time: the time at which this interactive option is enabled (the interactive feature can not be chosen unless it is enabled).

Disable Interaction Time: the time at which the interaction is disabled.

Interaction Clock: the Clock on which to base the Enable and Disable Times of the interactive features.

Jump Event Description: a description of the user interaction that will result in this event being selected. In practice, this entry would hold one of a number of possibilities, such as "user selects object on screen" or "user types in a number":

Clock: the clock on which the presentation will continue.

If the customer selects the interactive feature during this interval, the customer's CPE jumps from requesting and presenting objects along the main presentation path to the sub-presentation path. The screen is cleared of the main presentation objects, the active clock is now Clock 2 ($t_2=0$) corresponding to the sub-presentation path, and the image of Object 6 appears at $t_2=0$ remaining visible for 10 seconds. After $t_2=10$ seconds, the image of Object 7 appears and remains visible for 10 seconds until $t_2=20$ seconds. The sub-presentation is terminated at $t_2=20$ seconds, and presentation along the main presentation path is then resumed at the point in time where interrupted by the sub-presentation.

If the customer does not select the sidebar interactive feature during the 10 second interval, the presentation continues along the main presentation path without interruption. At 16 seconds into the main presentation ($t_1=16$ seconds), the image of Object 3 appears alongside the previous image of Object 1 and the sidebar icon of Object 2 and remains until $t_1=25$ seconds. At 17 seconds into the main presentation ($t_1=17$ seconds), the image of Object 4 similarly appears, alongside the previous images and remains until $t_1=25$ seconds. At 19 seconds into the main presentation ($t_1=19$ seconds), the sidebar icon disappears, the interactive feature is disabled, and selecting the sidebar has no effect. At $t_1=25$ seconds, the previous images of Objects 3 and 4 disappear and Object 5 appears and remains until $t_1=30$ seconds. The presentation terminates at $t_1=30$ seconds.

Now, we assume that the OMP shown in FIGS. 1B and 1C, as described above, is delivered by delivery system 10 of FIG. 1A which operates under the conventional client-server model. We also assume that the distribution network 30 operates at a network bit rate of 128 kb/s and that the memory capacity at the customer's CPE is 250 Kbytes. On receiving the customer's request for this presentation, a script of the presentation (the OMP and the Interaction Table) is transmitted from the server to the customer's CPE, and the CPE requests the objects of the presentation to be sent along the main presentation path of the presentation. In responding to the CPE's requests for delivery of the OMP, the server 22 begins by delivering objects along the main presentation path following Clock 1, with each object being transmitted as soon as requested. The CPE also tracks the size of objects to be transmitted to the CPE to ensure that the next object to be transmitted can be accommodated by the CPE memory. If the object cannot be accommodated, requests to the server are halted until the presentation time of previously delivered objects has passed, and objects are deleted from memory thus making memory available to store the next object.

Therefore, the CPE will request, and the server will deliver, Objects 1, 2, 3, 4, and 5, consecutively, with delivery start and end times as shown in FIG. 1E. Requests to the server are halted after Object 5 since the memory at the customer's CPE is full (250 Kbytes) and cannot accommodate additional objects at this time. Therefore, if the customer were to select the sidebar interactive feature after Object 5 has been sent to the CPE and before the interval ends at $t_1=19$ seconds, then the customer will experience a delay between the selection of the sidebar interactive feature and the presentation of Object 6. This delay would be attributable, in part, to the unavailable memory capacity at the CPE.

Even if the customer were to select the side bar at $t_1=19$ seconds, thereby essentially eliminating delays due to unavailable memory capacity, delays will also result due to interactive response time, which is the length of time between a customer's selection of an interactive feature and a change in the presentation reflecting the customer's selection. This response time includes the time necessary for the server to receive a request from the CPE reflecting the customer's selection, to react to the request, while simultaneously servicing requests of other customers, and to deliver objects to the CPE in response to the customer's interactive selection. Assuming that the customer's interactive selection is made at $t_1=19$ seconds and that the worst case interactive response time is 2 seconds, Objects 6 and 7 will be delivered with start and end times as shown in FIG. 1E.

The delays discussed above are largely a result of the reactive mode of operation of multimedia delivery systems operating under the conventional client-server model. Specifically, the server 22 delivers objects as requested by the customer's CPE along the main presentation path until the customer makes an interactive selection, and then the server reacts to the request of the customer's by transmitting those objects which fulfill the customer's selection as directed by the CPE. A drawback of such delivery systems is that the server in no way incorporates in its delivery strategy the delivery of objects that may be needed in the future to fulfill a customer's interactive selection such that delays or breaks in the presentation are eliminated.

Another major shortcoming of the server's reactive mode of operation is that the number of customers being served directly affects the interactive response seen by each customer. This means that as each new customer gains access to the system, the existing customers will likely notice decreased quality of performance, in the form of increased interactive response time. If one wishes to maintain interactive response time below a specified value, it is necessary to limit the number of customers or purchase a more powerful server. Otherwise, servicing more customers could result in significant contention at the server and ultimately interruptions or delays in the presentation of OMPs to customers. Since the server 22 must handle the delivery of OMPs to multiple customers simultaneously, it is important to properly scale the client-server ratio to ensure that delays in presenting the OMP will not exceed a preset maximum. This limitation imposed on the number of customers that can be serviced from a server affects the shared cost of the server among customers. Ideally, it is an objective to maximize the number of customers serviced by the server such that the cost of the server can be maximally shared among customers and widespread deployment of this delivery strategy can be achieved.

In view of the shortcoming of conventional approaches and mechanisms for delivering OMPs, an object of our invention is a system and method for providing interactive delivery of OMPs in real time. Another object of our invention is a delivery strategy which anticipates the object needs of the CPE along a main presentation path and delivers objects prior to the their presentation times. A further object of our invention is a delivery strategy which anticipates a customer's selections of an interactive feature and delivers objects that may be needed in the future to fulfill the customer's interactive selection such that delays or breaks in the presentation are virtually eliminated. Another objective of our delivery system and method is to increase the server-customer ratio realizable under a conventional client-server model without imposing unacceptable breaks or delays in the delivery of OMPs to customers.

SUMMARY OF THE INVENTION

An aspect of our invention is a system and method for preprocessing and delivering multimedia presentations to customers. Our inventive system comprises a preprocessor, mass storage, a delivery processor, a distribution network, and a plurality of presentation processors. The preprocessor receives as inputs an OMP, which includes presentation commands and associated objects, and presentation technology parameters (PTPs) indicating key information about the delivery processor, the distribution network, and the presentation processor which are to deliver and present the presentation to a requesting customer. This key information includes the round trip latency (RTL) between the delivery processor and the presentation processor, which RTL is the time for a 1 bit message to be sent from the presentation processor to the delivery processor and a response from the delivery processor to be received at the presentation processor.

Based upon these inputs, the preprocessor generates a preprocessed multimedia presentation (PMP) which includes a delivery schedule for delivering the presentation such that delays and gaps in presentation due to interactive response time are virtually eliminated.

The mass storage holds PMPs available for delivery, and the delivery processor delivers multimedia presentations requested by customers by following the delivery commands contained in the delivery schedule of the preprocessed multimedia presentation. Each customer has a corresponding presentation processor, and the delivery processor transmits a requested presentation to the presentation processor corresponding to the requesting customer via the distribution network. The presentation processor presents the objects of the presentation to the customer according to associated presentation commands received from the delivery processor.

The preprocessor includes a presentation scheduler, which analyzes the objects of the presentation, their associated presentation times, and customer interactive features and generates a delivery schedule such that:

1) each object and its associated presentation command arrive at the presentation processor no later than the time at which the object is to presented;

2) any object and its associated presentation command which are delivered to the presentation processor can be accommodated in its memory; and 3) the interactive response time due to the customer's selection of an interactive feature is virtually eliminated.
In generating the delivery schedule, the presentation scheduler also ensures that those objects to be presented in response to a customer's selection of an interactive feature are received at the presentation processor prior to their earliest possible presentation times.

The preprocessing of an OMP begins with the OMP and presentation technology parameters being loaded into the preprocessor. A delivery schedule in the form of a labelled, directed graph is generated by the presentation scheduler by defining a node including a delivery command for delivering a presentation command and its associated object from the delivery processor to the presentation processor. A presentation command and its associated object having the earliest presentation time are scheduled for earliest delivery, and each delivery command includes the delivery time and the identity of the presentation command and its associated object to be delivered.

The delivery processor delivers the presentation to the presentation processor corresponding to the requesting customer by executing the delivery schedule embedded in the PMP. Specifically, the delivery processor follows the labelled, directed graph representing the delivery schedule and executes the delivery command contained in each node of the graph. On encountering a node having multiple output leads, which indicates that an interactive feature is available for customer selection, the delivery processor checks if a message has been received from the presentation processor indicating the customer's selection of an interactive feature. Whether or not such a message is detected determines the path in the delivery schedule to be followed by the delivery processor in proceeding with the delivery of the presentation.

The presentation processor compares the time on its local clock with the time for executing each presentation command to determine if any of the presentation commands are due to be executed. If so, these commands are executed and then the commands and their associated objects are deleted from the memory. The presentation processor also monitors messages received from its corresponding customer indicating that an interactive feature has been selected. On receiving such a message, the presentation processor determines whether the interactive feature is enabled. If so, the presentation processor sends a message to the delivery processor indicating the customer's selection of the interactive feature.

Through our inventive, preprocessing and delivery system, multimedia presentations, which are conventionally delivered according to requests from a customer's CPE, are delivered based on a delivery schedule which ensures that each presentation command and associated object are delivered to the presentation processor prior to its presentation time even if an interactive feature is selected by the customer. Furthermore, the interactive response time of our system is virtually zero and remains so independent of the number of simultaneous customers actually being served by the delivery processor up to a fixed maximum. This result is not achievable in conventional systems employing the traditional client-server model, which systems have a greater than zero interactive response time that progressively worsens as more customers are simultaneously served by the conventional system.

BRIEF DESCRIPTION OF THE DRAWING

FIGS. 1B and 1C depict a table and graph, respectively, of objects representing an original multimedia presentation for illustrative purposes.

FIG. 1D depicts on interaction table corresponding to the original multimedia presentation of FIGS. 1B and 1C.

FIG. 1E depict the delivery of Objects 1 through 7, consecutively, over a prior delivery system operating under a traditional client-server model.

FIGS. 7A through 7E depict flow diagrams showing a representative embodiment of our preprocessing method, in accordance with an aspect of our invention.

FIG. 9 depicts a flow diagram showing a representative embodiment of our presentation method, in accordance with an aspect of our invention.

The organization and operation of the invention will be better understood from a consideration of the detailed description of the illustrative embodiments thereof, which follow, when taken in conjunction with the accompanying drawing.

DETAILED DESCRIPTION OF THE INVENTION

Our invention is a system and method for preprocessing and delivering multimedia presentations to customers. Our inventive system and method entail preprocessing an original multimedia presentation (OMP), comprising multimedia objects and presentation commands, to generate a preprocessed multimedia presentation (PMP), which includes a delivery schedule for delivering the presentation. In generating the delivery schedule, the OMP is analyzed and the time at which each object of the presentation is to be presented to the customer and the interactive features available for customer selection in the presentation are taken into consideration. Furthermore, the characteristics of the system components, which will deliver the presentation, and the round trip latency between system components are considered. Specifically, objects along a main presentation path of the OMP, which are objects to be presented independent of the customer's selection of an interactive feature, are scheduled for delivery such that each presentation command and associated object will be available for presentation to the customer prior to the presentation time of the object despite transmission delays inherent to the delivery system and the number of simultaneous customers actually being simultaneously served by the delivery system. Furthermore, objects along a sub-presentation path of the OMP, which are conventionally delivered to the customer only after an appropriate customer interaction has been selected, are scheduled for pre-delivery in anticipation of the customer's interaction such that delays due to interactive response time are essentially eliminated.

Figure 2:
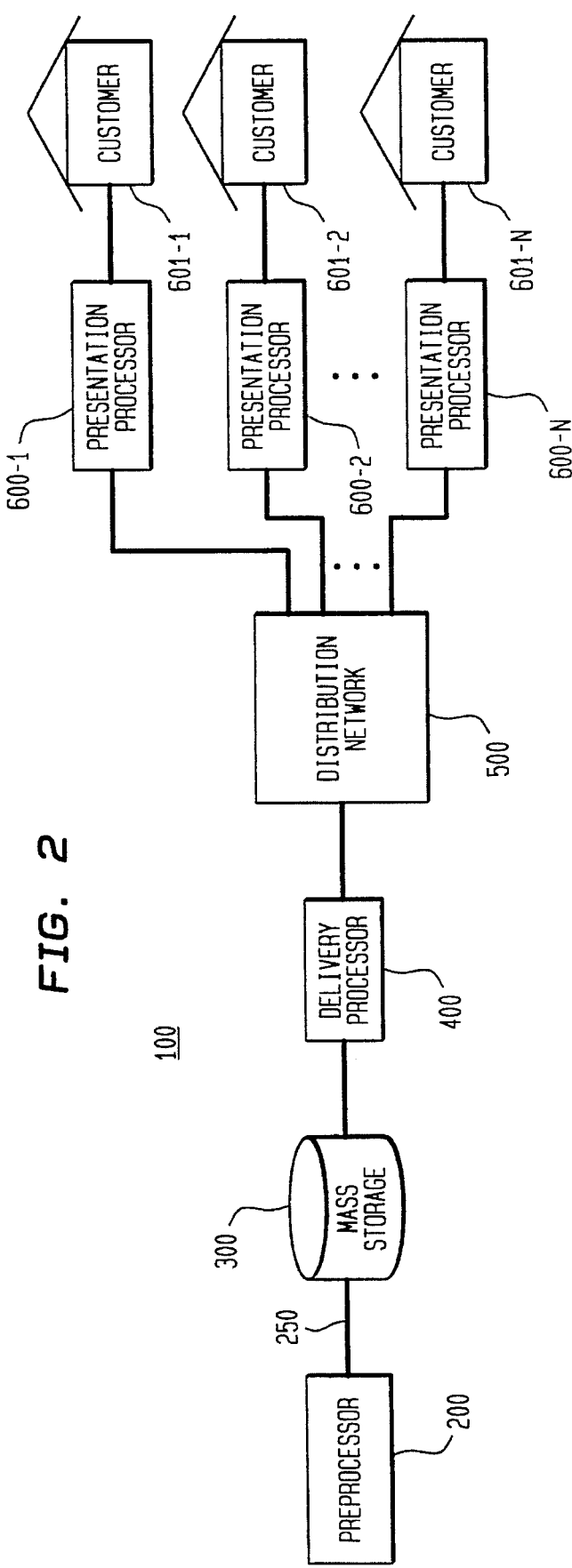
FIG. 2 depicts an illustrative embodiment of our multimedia preprocessing and delivery system for preprocessing and delivering multimedia presentations to customers, in accordance with our invention.

FIG. 2 depicts an illustrative embodiment of our multimedia preprocessing and delivery system 100. Our system 100 includes a multimedia preprocessor 200, a mass storage 300, a delivery processor 400, a distribution network 500, and a plurality of presentation processors 600-1 through 600-N. The preprocessor 200 receives an OMP, which comprises multimedia objects and associated presentations commands for presenting the multimedia objects to a customer based upon the customer's interactive commands under a traditional client-server model. The preprocessor 200 also receives other inputs called presentation technology parameters (PTPs) which indicate key information characterizing components of system 100, which components are employed in delivering the presentation to a customer. This key information includes the round trip latency (RTL) between the delivery processor and the presentation processor, which RTL is the time for a 1 bit message to be sent from the presentation processor to the delivery processor and a response from the delivery processor to be received at the presentation processor. The PTPs also include the bit rate of distribution network and the memory capacity of the presentation processor. Based upon these inputs, the preprocessor generates a PMP.

In addition to the multimedia objects and presentation commands of the OMP, the PMP includes a delivery schedule to be executed by the delivery processor 400 for delivery of the presentation virtually without delays due to interactive response time.

The PMP generated at preprocessor 200 is stored at mass storage 300, which is connected to the preprocessor 200 via output 250 and which stores PMPs available for delivery on customer request. The delivery processor 400 is in communication with the presentation processors 600-1 through 600-N, which correspond to customers 601-1 through 601-N, respectively, via the distribution network 500. Upon receiving a request from a customer for a multimedia presentation, the delivery processor 400 retrieves the requested PMP from storage 300. The delivery processor 400 executes the delivery schedule embedded in the PMP and delivers the multimedia objects and presentation commands to the presentation processor corresponding to the requesting customer. The presentation processor 600 presents the multimedia objects to the customer according to presentation commands. The presentation processor 600 also receives messages from its customer, which messages may include the customer's selection of an interactive feature, and on receiving such a message, the presentation processor 600 forwards a message to the delivery processor 400 advising it of the customer's selection.

The distribution network 500 interconnecting the delivery processor 400 and the presentation processors 601-1 through 601-N comprises transmission equipment and transmission links of fiber optic, coaxial, or copper cable or other suitable transmission medium. Specifically, the distribution network could be the distribution portion of a public switched telephony network (PSTN), which employs Integrated Services Digital Network (ISDN) technology operating at a basic rate of 128 Kb/s or asymmetrical digital subscriber line (ADSL) technology, which provides transport at 1.5 Mb/s, downstream, and a few kilobits/second, upstream, overlaid on a telephony channel. Alternatively, the distribution network 500 could also include a local area network.

MULTIMEDIA PREPROCESSOR

Figure 3:
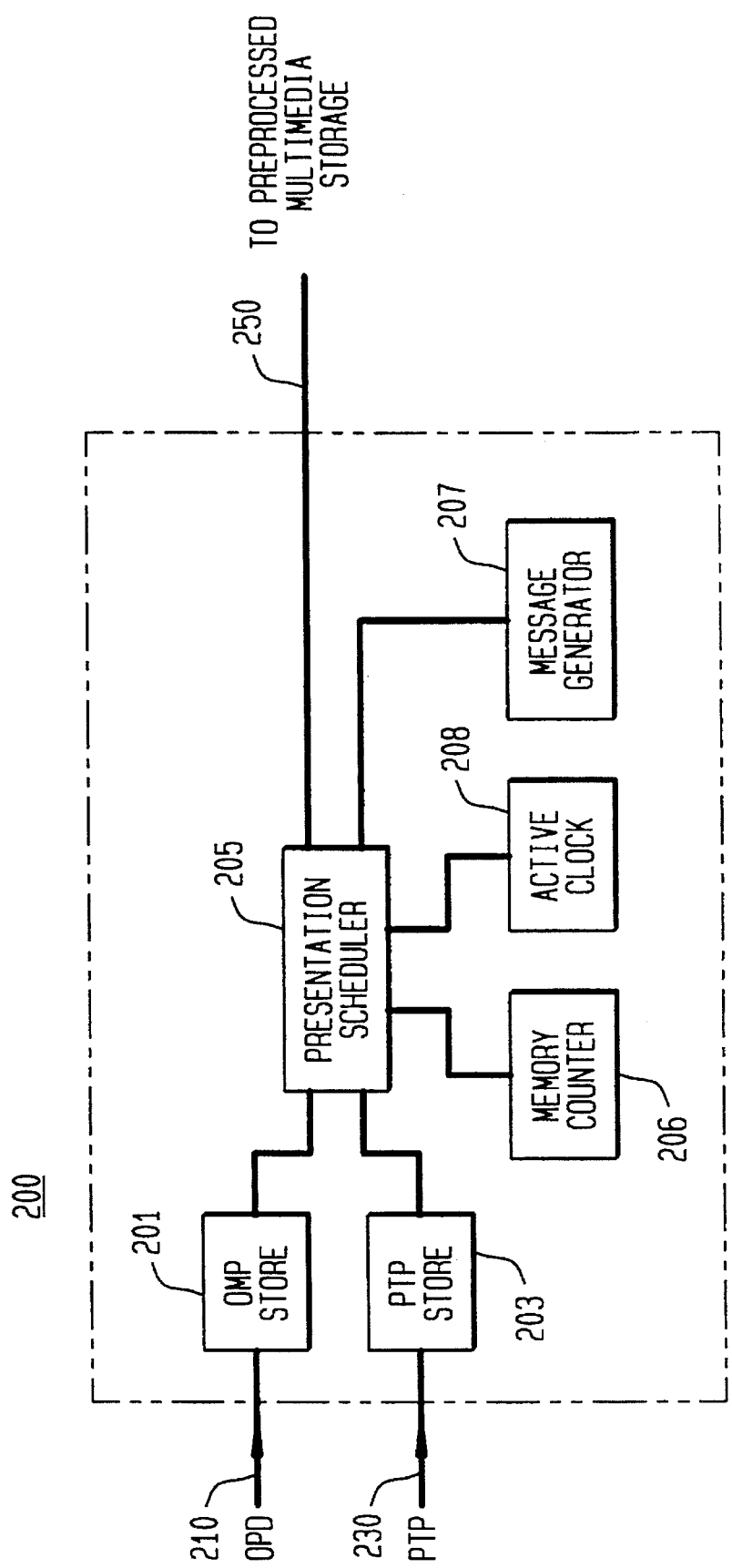
FIG. 3 depicts an illustrative embodiment of our multimedia preprocessor in accordance with our invention.

A detailed depiction of an illustrative embodiment of our multimedia preprocessor 200 is shown in FIG. 3. The preprocessor 200 receives as an input at input port 210 an OMP, which is stored in OMP storage 201 and which may have been created using any of the well-known multimedia authoring systems. Such systems allow authors to create presentations including formatted multi-font text, animations, graphics images, photographic images, audio and motion video. Many of these systems, such as Macromedia's Authorware Professional, provide a graphical user interface enabling authors to create presentations by manipulating images on a computer display.

Figure 1A:
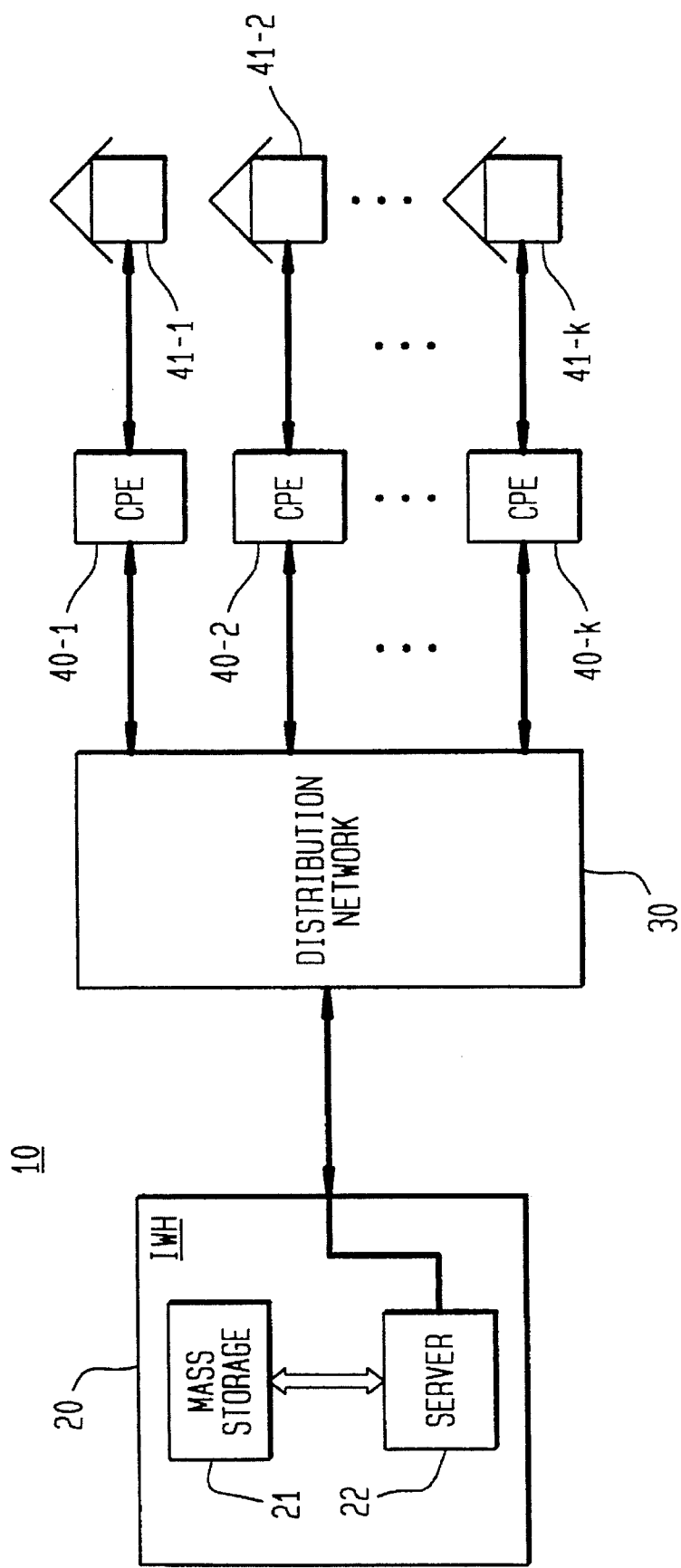
FIG. 1A depicts, from the prior art, an illustrative embodiment of a delivery system employing a prior client-server model for transporting multimedia presentations to customers.

The output of the authoring system may not be in a format suitable as input to the preprocessor 200. Therefore, the output of the authoring system may require a software translation into the format suitable for the preprocessor 200. For purposes of discussion, it is assumed that the OMP is in a format acceptable to the preprocessor 200. An illustrative OMP is depicted in FIGS. 1B and 1C and is described in the Background of the Invention.

Another input to the preprocessor 200 at input port 230 is the presentation technology parameters (PTPs), which define characteristics of the delivery processor 400, the distribution network 500, and the presentation processor 600. The PTPs include the minimum bit rate of the distribution network 500, the maximum memory capacity of the presentation processor 600, and the round trip latency (RTL) between the delivery processor 500 and the presentation processor 600. The PTPs may be manually inputted at input port 230 from a human interface. Alternatively, the preprocessor may request the PTP from the system component being characterized by the PTP. For example, the preprocessor could prompt presentation processor 600-1 for its memory capacity, the delivery processor for the RTL between the delivery processor 400 and presentation processor 600-1, and the distribution network, connecting the delivery processor 400 and presentation processor 600-1, for its bit rate. Each component prompted by the preprocessor would electronically transmit the requested PTP to the preprocessor at input port 230. The delivery processor includes a PTP generator 407 (discussed infra), which transmits signals to and and receives signals from a presentation processor to measure a RTL as input to the preprocessor. Based on the PTPs and the OMP, the preprocessor 200 generates at output port 250 a PMP, which includes a delivery schedule comprising delivery commands to be executed by the delivery processor for delivery of the presentation to the presentation processor 500.

The preprocessor 200 comprises an OMP store 201 for receiving and storing the presentation to be preprocessed and a PTP store 203 for receiving and storing these parameters to be used during preprocessing. The preprocessor also includes a memory counter 206 for tracking the available memory at the memory store 603 (See FIG. 5, discussed infra) of the presentation processor 600 as multimedia objects are scheduled for delivery. The preprocessor 200 also includes an active clock 208 for tracking the current time into the presentation along a particular path of the presentation and associated with a particular clock.

Additionally, the preprocessor 200 comprises a presentation scheduler 205 which controls the preprocessing of the OMP. The presentation scheduler 205 assesses the objects to be delivered and their associated presentation times and the interactive features that may be selected by the customer during pre-specified intervals of the presentation. Considering the results of this assessment and the PTPs defining the characteristics of the delivery system which is to deliver and present the presentation, the presentation scheduler 205 generates a PMP comprising a delivery schedule for delivering the presentation such that interactive response delays and gaps in the presentation are virtually eliminated. In the case where a delivery schedule cannot be generated for a presentation to avoid such delays and gaps, the presentation scheduler 205 causes a message generator 207 to relay an error message indicating that an optimal delivery schedule is unachievable for the presentation over a delivery system having the specified PTPs.

In generating the delivery schedule, the presentation scheduler analyzes the objects, their associated presentation times, and optional customer interactive features. The presentation scheduler 205 then generates delivery commands which comprise the delivery schedule such that:

1) each presentation command and its associated object arrive at the presentation processor no later than the time at which the object is to be presented;

2) any presentation command and associated object delivered to the presentation processor can be accommodated at the memory of the presentation processor; and 3) the interactive response time due to the customer's selection of an interactive feature is virtually eliminated.

For certain OMPs, it may not be possible to produce a delivery schedule meeting these constraints. In such cases, the presentation scheduler 205 may cause the message generator 207 to report an error and may halt the preprocessing operation.

The delivery schedule generated by the presentation scheduler during preprocessing can be best described as a labelled, directed graph, G, comprising nodes, leads, and labels, wherein:

$G = (N, LE, LA)$ $N = (S, E, R)$

N is a set of nodes

S (an element of N) is a designated Start Node

E (an element of N) is a designated End Node

R (a subset of N) is a set of Return Nodes

LE is a set of leads, which are output leads from nodes

LA is a set of labels for each lead, each label being an integer

The Start (S) Node contains instructions for the delivery processor to begin delivery of the multimedia presentation to the presentation processor. The End (E) Node contains instructions to notify the delivery processor that the delivery of the presentation is completed, and the Return (R) Node contains instructions for the delivery processor to return in the graph to the point prior to the current node.

Each lead in the graph has a label which is an integer. These labels indicate points where the delivery processor may receive messages from the presentation processor in response to interactive features being offered to the customer. A lead labelled zero indicates the default path to be followed if no message indicating the selection of an interactive feature is received at the delivery processor. A lead having a non-zero label indicates an alternate path that should be followed if such a message is received. If a customer selects an interactive feature, a message is sent from the presentation processor to the delivery processor, and the delivery processor checks for such messages at appropriate labels in the delivery schedule. Such messages are interpreted by the delivery processor to correspond to a label and are used by the delivery processor to identify the lead that should be followed in continuing the delivery of the presentation.

Each node, N, contains a delivery command, which may include commands for the delivery processor to "send" information to the presentation processor, "wait" for a customer interaction, or "halt" delivery of the presentation to the presentation processor. A send command contains an object which is to be delivered to the presentation processor, the presentation command associated with the object being delivered, and the earliest time at which the object is to be delivered. The wait and halt commands contain no objects for delivery.

In generating the delivery schedule, the preprocessor maintains a view of the time on the active clock and available memory at the presentation processor by simulating the delivery of the presentation from the delivery processor and the play out of the multimedia presentation at the presentation processor. One of the basic operations of the presentation scheduler 205 is to schedule an object for delivery to the presentation processor by incorporating a node, N, containing a send command into the delivery schedule. The presentation scheduler 205 schedules objects for delivery according to presentation time, with objects having the earliest presentation time being scheduled for earliest delivery. Objects to be presented only if the customer selects an interactive feature are scheduled for delivery such that a sufficient number of these objects are available for presentation as of the time that the interactive feature is offered to the customer such that delays due to interactive response time delays are virtually eliminated.

In determining the placement of the node in the delivery schedule and generating the associated send command, the presentation scheduler 205 determines the earliest time at which the presentation processor 600 will have sufficient available memory to accommodate this object by tracking the presentation processor's available memory capacity at memory counter 206. If no such time can be identified by the preprocessor, or if the identified time is later than the presentation time of the object, then the presentation may be deemed undeliverable. The presentation scheduler may discontinue the preprocessing operation and cause an error message to be generated at the message generator 207.

If an appropriate time is identified, the presentation scheduler 205 inserts a node containing a send command into the the delivery schedule. This send command identifies the delivery start time of the object, the object to be delivered, and its associated presentation command to be executed by the presentation processor. If the presentation scheduler 205 finds, by checking its memory counter 208, that an object and its associated presentation commands cannot be accommodated in its entirety by the presentation processor prior to the presentation time, but that there is some, but limited available memory at the presentation processor, the presentation scheduler may repackage the original object into smaller objects for delivery at different times under different send commands.

The presentation scheduler 205 will include a wait command in the delivery schedule to instruct the delivery processor to wait until a pre-specified period of time has elapsed or until a pre-specified condition is met. Alternatively, a wait command could instruct the delivery processor to wait for a customer interaction before proceeding with the delivery of the presentation. Since the delivery processor will, in general, be serving multiple customers, it is expected that the delivery processor will process delivery schedules for other customers while it is waiting. The presentation scheduler may also generate a halt command to instruct the delivery processor to terminate delivery of the presentation.

DELIVERY PROCESSOR

Figure 4:
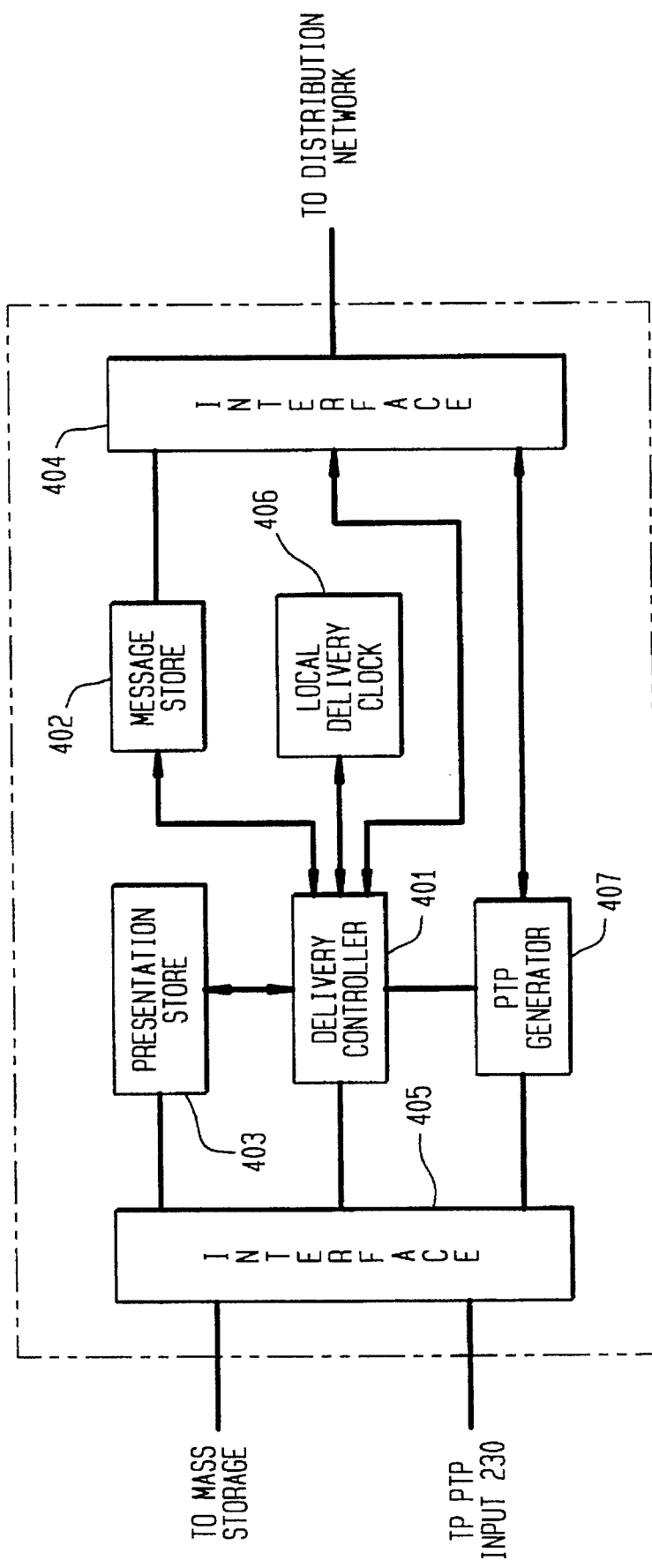
FIG. 4 depicts an illustrative embodiment of our delivery processor in accordance with an aspect of our invention.

An illustrative embodiment of our delivery processor 400 is shown in FIG. 4 and comprises an interface 405 to the mass storage 300 and an interface 404 to the presentation processors 600-1 through 600-N via the distribution network 500. Another component of the delivery processor is the PTP generator 407, which determines the RTL between the delivery processor and a presentation processor, which round trip latency is used by the preprocessor during preprocessing.

As described above, the RTL is the time for a 1 bit message to be sent from a presentation processor to the delivery processor and a response from the delivery processor to be received at the presentation processor. Therefore, the RTL is the time required for the following actions to occur:

1) Transmission of a message consisting of one bit from a presentation processor via the distribution network to the presentation processor;

2) Detection of this message and generation of a one bit response by the delivery processor while serving a maximum number of simultaneous presentation processors; and 3) Transmission from the delivery processor, via the distribution network, of a one bit response to the presentation processor.

To determine the RTL between the delivery processor and a presentation processor, the PTP generator 407 sends a message via the interface 404 to the distribution network 500 requesting the one-way propagation delay (PD) of the network, which propagation delay is the time for one bit to travel over the distribution network from the delivery processor to the presentation processor. Furthermore, the PTP generator requests from a delivery controller 401 (discussed infra) of the delivery processor, which executes delivery commands of the PMP, information regarding the worst case service time (ST), in second, of the delivery controller. This information is specific to the delivery controller and is dependent on the performance of the software and hardware employed therein. The service time is the maximum time for the delivery controller, once receiving a message from the presentation processor indicating the customer's selection of an interactive feature, to respond with appropriate presentation commands and objects, while simultaneously serving other presentation processors under worst case conditions. The PTP generator may have been preprogrammed with the service time of the delivery processor, thus precluding the need to request this information from the delivery controller. Alternatively, the PTP generator could be an element of the delivery controller.

The PTP generator then uses the network propagation delay (PD) received from the distribution network and the service time (ST) received from the delivery controller and generates the round trip latency (RTL) based on the following mathematical expression:

$$\text{RTL (seconds)} = [2(PD) + ST]. \qquad (1)$$

The PTP generator may also request and receive from the distribution network its network bit rate, and from the presentation processor, via interface 404, its memory capacity, thereby permitting the preprocessor to retrieve all PTPs from the PTP generator 407 in lieu of having to communicate directly with the distribution network and presentation processor. On being prompted by the preprocessor for PTPs, the PTP generator sends, via interface 405, the PTPs requested.

The delivery processor further includes a presentation store 403, where preprocessed multimedia presentations are stored once retrieved from mass storage 300, and a local delivery clock for tracking the current time at the delivery processor. Also, the delivery processor includes a message store 402 for holding messages received from the presentation processor including messages indicating customers' selections of interactive features.

Another element of the delivery processor is a delivery controller 401, which, on receiving a presentation request from a customer, causes the PMP version of the requested presentation to be retrieved from mass storage 300 of FIG. 2 into the presentation store 403 via interface 405. The delivery controller 401 then delivers the presentation to the presentation processor corresponding to the requesting customer by implementing the delivery schedule embedded in the PMP. Specifically, the delivery controller 401 follows the labelled, directed graph representing the delivery schedule and executes the delivery command contained in each node of the graph.

The main function of the delivery processor 400 is to execute the delivery schedule beginning with the Start (S) Node and following the delivery commands contained in each node. If the inspected node contains a halt command, the delivery processor halts delivery of this presentation to the presentation processor until a pre-specified time has elapsed or some other specified condition has been fulfilled. If the inspected node contains a send command, the delivery processor waits (if necessary) until the current time is equal to the delivery time in the command. The delivery processor then transmits the specified object to the presentation processor. If the inspected node contains a wait command, the delivery processor inspects the output lead(s) of the node. Each node will have a single output lead labelled 0, and may have one or more leads labelled with a non-zero integer.

On encountering a node having multiple output leads, which indicates that an interactive feature is available for customer selection, the delivery controller 401 of the delivery processor will check the message store 402 to determine if a message has been received from the presentation processor indicating customer's selection of an interactive feature. If such a message has been received, the delivery processor follows the lead having a label which corresponds to the customer's message and inspects the node that is reached by following that lead. If no such message is received or if the node has a single lead labelled 0, indicating that no customer interactive feature is available for selection, the delivery processor will follow the lead labelled zero and inspect the node that is reached. In inspecting a node, the delivery processor reads the delivery commands contained in the node and executes them as instructed. Then, the delivery processor inspects the outgoing leads from that node to determine its next action.

PRESENTATION PROCESSOR

Figure 5:
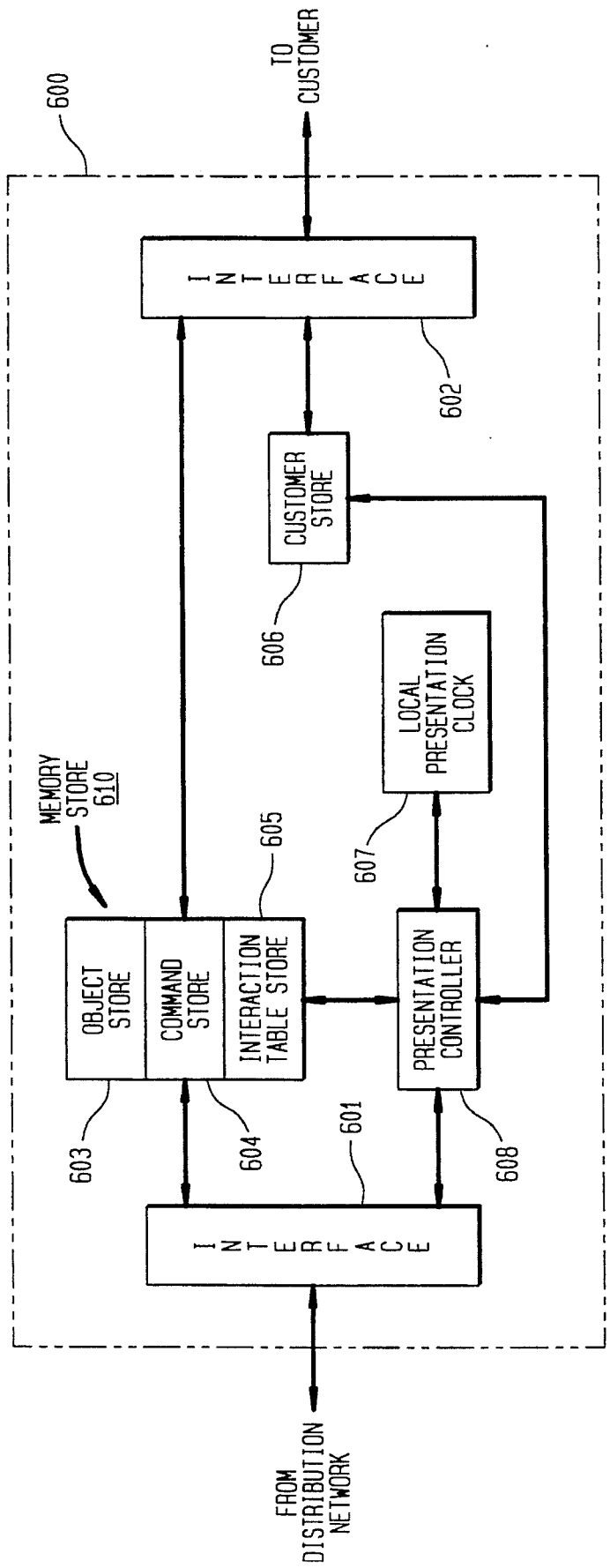
FIG. 5 depicts an illustrative embodiment of our presentation processor in accordance with an aspect of our invention.

An illustrative embodiment of our presentation processors 600-1 through 600-N is shown in FIG. 5. Each presentation processor comprises an interface 601, which receives information for communicating messages to the delivery processor 400. The presentation processor also comprises an interface 602 for communicating with its corresponding customer. A memory store 610 is located at the presentation processor which may be partitioned into an object store 603, for storing objects of the multimedia presentation, a command store 604, for storing presentation commands, and an interaction table store 605, for storing the interaction table of the presentation being presented. In addition, a customer input store 606 for collecting and storing customer's inputs, which may include a message indicating a customer's selections of an interactive feature, is also an element of the presentation processor 600.

The presentation processor also includes a local presentation clock 607 which tracks the local time at the presentation processor. Another element of the presentation processor is a presentation controller 608 which executes presentation commands received from the delivery processor and presents the objects of the presentation as instructed. The presentation controller 608 causes interface 601 to store presentation commands in command store 604, presentation objects in object store 603, and the interaction table in store 605. Another function of the presentation controller 608 is to check the customer store for messages from the customer indicating selection of an interactive feature. Upon selecting such a message, the presentation controller 608 forwards a message to the delivery processor 400 via interface 601 and the distribution network 500 (see FIG. 2).

The basic function of the presentation processor is to receive and process objects and presentation commands sent by the delivery processor as a result of executing delivery commands and to present the objects to the customer as instructed in the presentation commands. The presentation commands contain instructions for the presentation processor to execute and the time at which such instructions should be executed. In particular, a presentation command may contain the time at which an associated object is to be presented.

The presentation controller of the presentation processor continually compares the time on its local clock with the time for executing each presentation command to determine if any of the presentation commands are due to be executed. If so, these commands are executed and then the commands and their associated objects are deleted from the memory store 610. The presentation controller also monitors customer store 606, and if a message is received at store 606 indicating that an interactive feature has been selected, the presentation processor checks the interaction table stored at store 605 to determine whether the interactive feature is enabled. If so, the presentation processor sends a message to the delivery processor indicating the customer's selection of the interactive feature.

ILLUSTRATIVE PROCESSING AND DELIVERY OF OMP

The operation of our processing and delivery system is described below. First, operation of the preprocessor and the steps taken in generating a PMP and its associated delivery schedule for the illustrative OMP shown in FIGS. 1B and 1C are discussed, and FIGS. 7A through 7E show a flow diagram of our preprocessing method 800. As indicated in the background of the invention, we assume that the distribution network 500 operates at a network bit rate of 128 kb/s and that the memory capacity at the customer's CPE is 250 Kbytes. We also assumed that the RTL is 2 seconds.

Figures 6A, 6B:
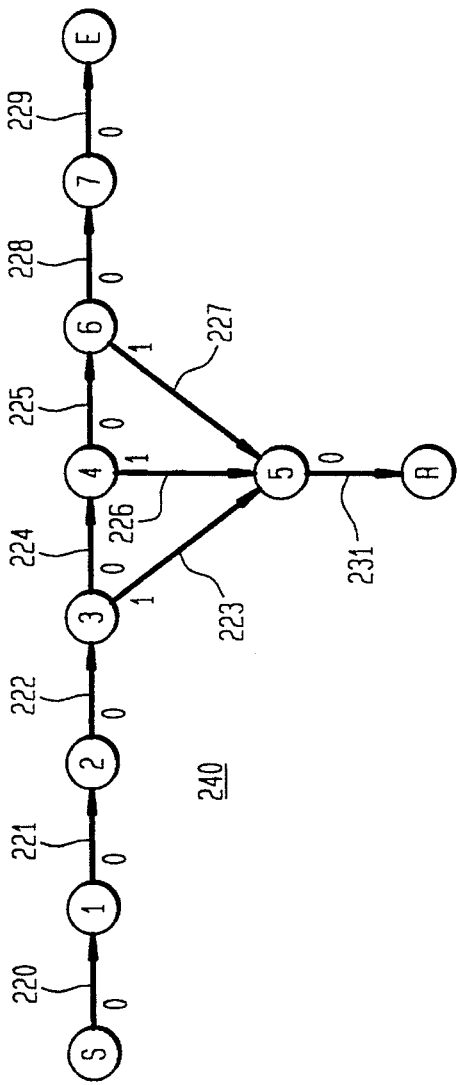
FIG. 6A depicts a table of the delivery times of preprocessed multimedia presentation corresponding to the original multimedia presentation of FIGS. 1B and 1C, in accordance with an aspect of our invention.
FIG. 6B depicts a labelled, directed graph representing a delivery schedule for the preprocessed multimedia presentation, in accordance with an aspect of our invention.
Figure 7A:
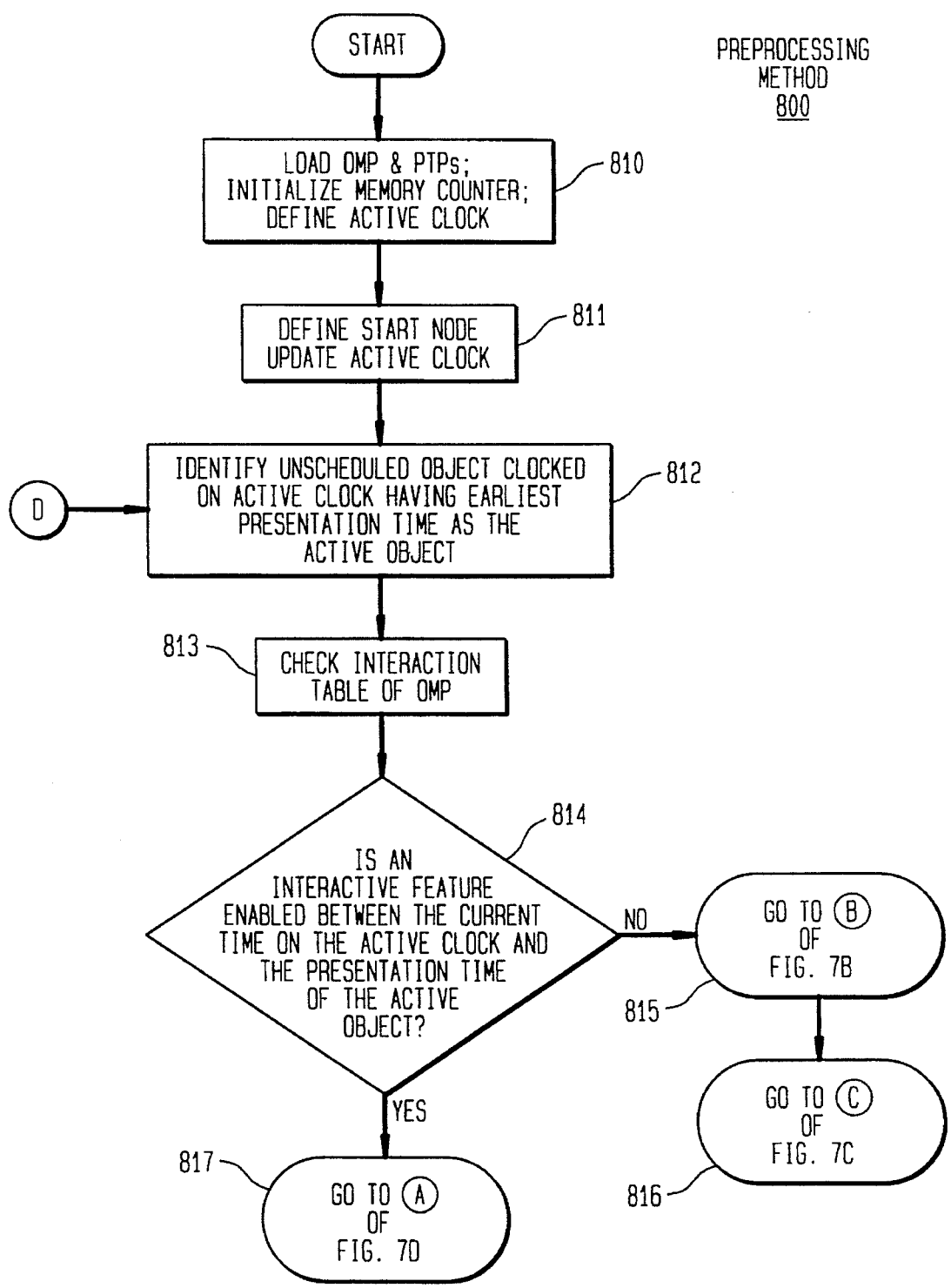

Preprocessing of an OMP begins with the OMP being loaded into the OMP store 201 and the PTPs being loaded in the PTP store 230 (Step 810 of FIG. 7A). The PTPs may be loaded manually from a human interface or inputted directly from the delivery processor 400, distribution network 500, or presentation processor 600 to be employed in delivering and presenting the presentation. In generating a delivery schedule 240, depicted in FIG. 6B, the presentation scheduler will define the clock of the main presentation, Clock 1, as the active clock, set the active clock to $t_1=0$, initialize the memory counter to 250 Kbytes, and define a Start (S) Node (Step 811). The Start Node contains instructions for the delivery processor to begin delivery of the multimedia presentation to the presentation processor. This node will also contain a send command for the delivery processor to send the interaction table of the presentation to the presentation processor and a presentation command to be delivered by the delivery processor to the presentation processor instructing it to wait five seconds before proceeding with the play out of the presentation. Also, the start node contains instructions for the delivery processor to make Clock 1 the active clock which is initialized at $t_1=0$. After defining the Start Node, the presentation scheduler 205 updates the active clock to reflect the time that will lapse in executing the delivery commands contained in the Start Node (Step 811). Since the time required to deliver the interaction table and this command to the presentation processor is infinitesimally small, the time on the active clock 208 after the Start Node has been executed remains at $t_1=0$.

In scheduling objects for delivery, the presentation scheduler first analyzes the OMP to identify the unscheduled object on Clock 1 having the earliest presentation time (Step 812). In finding that Object 1 has the earliest presentation time ($t_1=5$ seconds), the preprocessor makes Object 1 the current object for scheduling (Step 812). The presentation scheduler inspects the interaction table of the OMP (see FIG. 1D) and determines whether an interactive feature is available for selection by the customer between the current time on the active clock ($t_1=0$) and the presentation time ($t_1=5$ seconds) of the current object (Object 1) (Stop 813). As shown in FIG. 1D, an interactive feature is available for selection by the customer only between $t_1=9$ seconds and $t_1=19$ seconds.

Since no interactive feature is available for selection between $t_1=0$ and $t_1=5$ seconds (Steps 814 and 815), the memory counter can accommodate the 50 Kbytes of Object 1 (Step 820 of FIG. 7B), and Object 1 can be delivered prior to its presentation time ($t_1=5$ seconds) (Step 822), the presentation scheduler includes in the delivery schedule Node 1, which contains a send command for delivering Object 1 and its associated presentation command with delivery start and end times of 0.0 and 3.1 seconds, respectively, as shown in FIG. 6A (Step 823). If Object 1 could not have been delivered prior to its presentation time, an error message would have been generated at the message generator 207 (Step 824). Furthermore, as shown in FIG. 6B, the presentation scheduler includes lead 220, which is labelled 0 and which connects the Start Node and Node 1, to indicate the default path to be followed in the delivery schedule (Step 825). In addition, the presentation scheduler 250 tracks the available memory at the presentation processor at memory counter 206 which indicates that 200 Kbytes of available memory will remain after the 50 Kbytes of Object 1 are delivered (See FIG. 6A and Step 826 of FIG. 7B). The presentation scheduler then updates the active clock which indicates that 3.1 seconds have elapsed after the object has been delivered resulting in $t_1=3.1$ seconds (Step 826).

Since there are other unscheduled objects on the active clock (Step 816 of FIG. 7A and Steps 850 and 854 of FIG. 7C), the presentation scheduler then similarly schedules the delivery of the next unscheduled object to be presented on Clock 1 having the earliest presentation time, Object 2. No interactive feature is enabled between the current time on the active clock ($t_1=3.1$ seconds) and the presentation time of Object 2 ($t_1=9$ seconds). Therefore, the scheduled delivery of Object 2 is represented by Node 2, in the graph of FIG. 6B, and lead 221, labelled 0, connects Nodes 1 and 2. As indicated in FIG. 6A, Object 2 is scheduled for delivery starting at $t_1=3.1$ seconds. Since Object 2 contains only 50 bytes of information, the total time for delivering this object to the presentation processor is negligible and the end delivery time of Object 2 is 3.1 seconds. After delivery of Object 2, $t_1=3.1$ seconds. In scheduling the delivery of Object 3 and inspecting the interaction table of the OMP, the presentation scheduler determines that an interactive feature is available for selection by the customer between the current time on the active clock ($t_1=3.1$ seconds) and the presentation time of Object 3 ($t_1=16$ seconds) (Step 814 of FIG. 7A). The presentation schedule refers to the interaction table and determines that the selection of the interactive feature would result in Clock 2 becoming the active clock and Objects 6 and 7 being presented prior to Object 3.

To ensure that sufficient information is available at the presentation processor in the case that the interactive feature is selected, the presentation scheduler shifts from scheduling Object 3 to a determination of what portions of Objects 6 and 7 should be pre-delivered to the presentation processor such that the interactive response time is virtually eliminated (Step 817 of FIG. 7A). To make this determination, the presentation scheduler first determines that Object 6 would be the earliest unscheduled object to be presented on Clock 2 if the interactive feature is selected (Step 830 of FIG. 7D) and makes Object 6 the active object (Step 831).

Figure 7B:
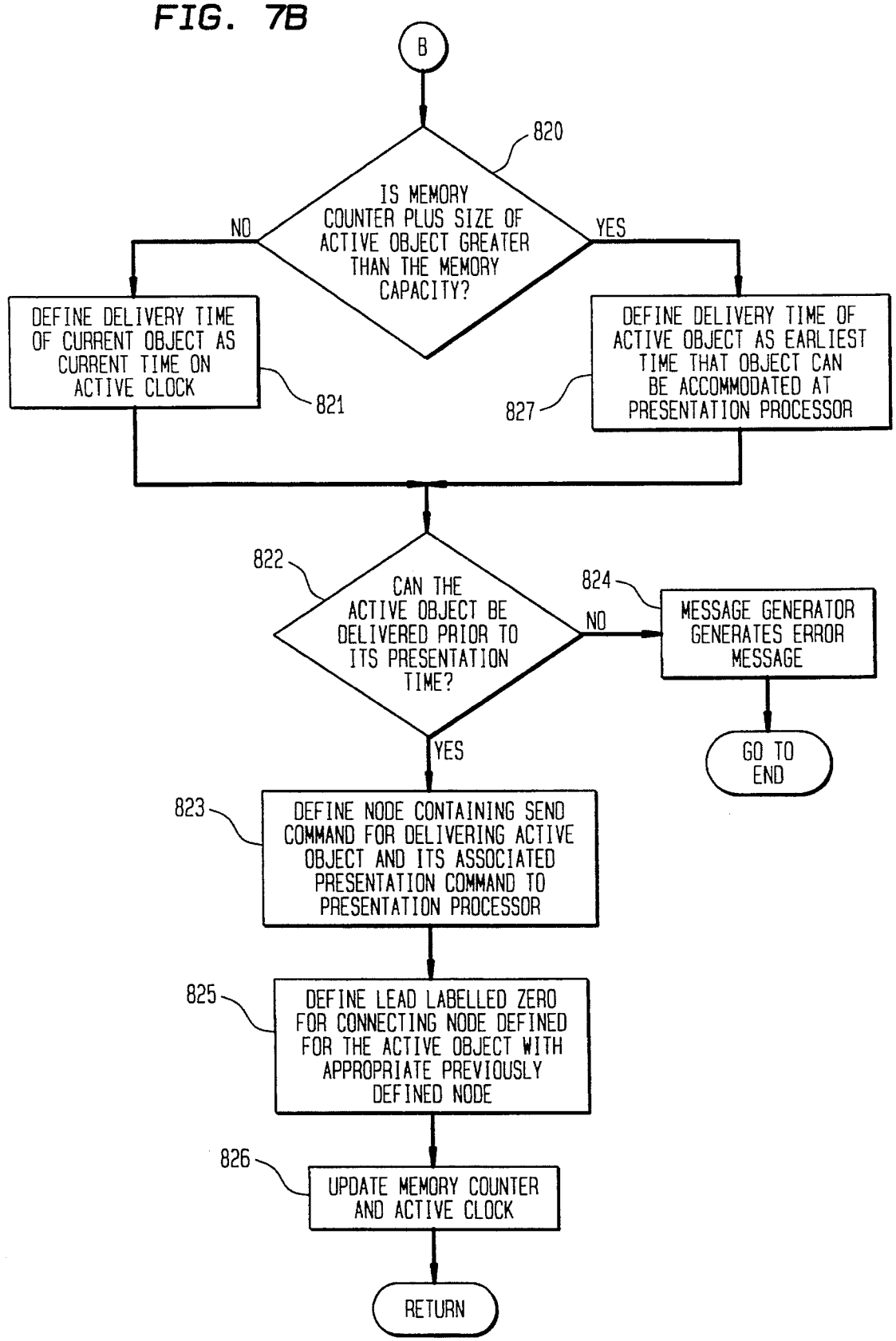

The presentation scheduler next determines whether the available memory at the presentation processor is sufficient to accommodate the 50 Kbytes of Object 6 and whether Object 6 can be delivered prior to its earliest presentation time (Steps 820 and 822 of FIG. 7B). As shown in the interaction table of FIG. 1D, the sidebar interactive feature could be selected as early as $t_1=9$ seconds. Therefore, the earliest presentation time of Object 6 is $t_1=9$ seconds. The next available delivery time is $t_1=3.1$ seconds and transmission of Object 6 from the delivery processor to the presentation processor would take 3.1 seconds. Therefore, if scheduled as the next object for delivery, Object 6 would be completed at $t_1=6.2$ seconds, which time is prior to its earliest presentation time of $t_1=9$ seconds. The available memory at the presentation processor is 200 Kbytes which can accommodate the 50 Kbytes of Object 6.

Since Object 6 can be completely delivered to the presentation processor prior to its earliest presentation time, and since sufficient memory is available at the presentation processor, the presentation scheduler schedules the delivery of Object 6 by adding Node 3 into the delivery schedule of FIG. 6B, with delivery start and end times of $t_1=3.1$ and 6.2 seconds, respectively, as shown in FIG. 6A. In addition, the presentation scheduler continues to track the available memory at the presentation processor at memory counter 206 which indicates 150 Kbytes of available memory after Object 6 is delivered. The presentation scheduler also includes lead 222, as shown in FIG. 6B, which is labelled 0 and which connects Nodes 2 and 3. The active clock is updated to reflect a current time of $t_1=6.2$ seconds after the delivery of Object 6 (Steps 820–826 of FIG. 7B).

Figure 7D:
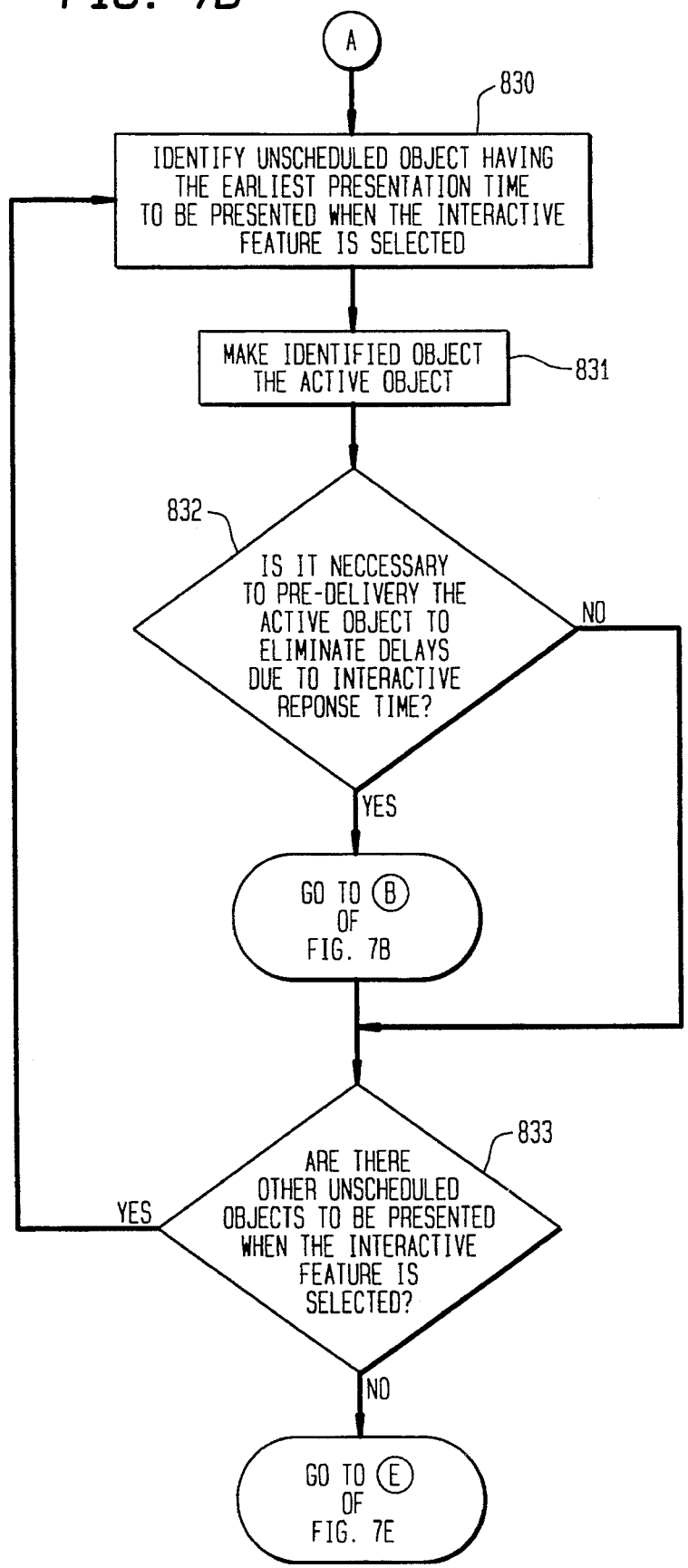

Since the objects on Clock 2 will only be presented by the presentation processor in the case that the customer selects an interactive feature, the presentation scheduler next assesses whether there is a need to schedule the delivery of the next object on Clock 2, Object 7, to ensure that the interactive response time is virtually eliminated (Steps 833 and 832 of FIG. 7D). Therefore, the presentation scheduler assesses whether the delivery of Object 7 can be delayed until after the customer selects the interactive feature without interactive response delays being realized. This determination is made by comparing the earliest time that Object 7 can be completely delivered to the presentation processor after the interactive has been selected to the earliest presentation time of Object 7. Once the customer selects the interactive feature, Object 6 will be played out by the presentation processor for 10 seconds, from $t_2=0$ to 10 seconds. Object 7 is to be presented at the completion of Object 6 at $t_2=10$ seconds. Therefore, pre-delivery of Object 7 may not be necessary if the delivery processor can deliver the 100 Kbytes of Object 7 to the presentation processor within 10 seconds after the interactive feature is selected. In determining whether to pre-deliver Object 7, the presentation scheduler considers the round trip latency (RTL=2 seconds) plus the time to deliver the 100 Kbytes of Object 7 over the distribution network (100 Kbytes times 8 bits per second divided by 128 kilobits per second=6.3 seconds). Therefore, if Object 7 is delivered to the presentation processor after the interactive feature is selected, Object 7 will be completely delivered to the presentation processor at $t_2=8.3$ seconds, which is prior to the presentation time ($t_2=10$ seconds) of Object 7.

Since Object 7 can be delivered to the presentation processor after the interactive feature has been selected but before its presentation time, the presentation scheduler does not schedule Object 7 for automatic pre-delivery immediately following Object 6. Instead, the presentation scheduler determines that Object 7 should be delivered with start and end times of $t_2=2.0$ and 8.3 seconds after Object 6 conditioned on a message from the presentation processor being received at the delivery processor indicating that the interactive feature has been selected by the customer. Therefore, the presentation scheduler includes in the delivery schedule Node 5 a send command for the delivery processor to deliver Object 7 at the time the interactive feature is selected (Steps 840–842). Furthermore, the presentation scheduler also includes in the delivery schedule lead 223, labelled 1 and connecting Nodes 3 and 5, to accommodate the case where a message indicating the customer's selection is received at the delivery processor (Step 843). If there were other objects to be presented on the interactive feature being selected, they also would have been similarly scheduled for delivery (Step 844). In addition, the presentation processor includes in the delivery schedule a return (R) node which is connected to Node 5 via lead 231, labelled 0 (Step 845). The return node contains instructions for the delivery processor to return in the delivery schedule to the point prior to the current node, which point would be at Node 3.

Figure 7E:
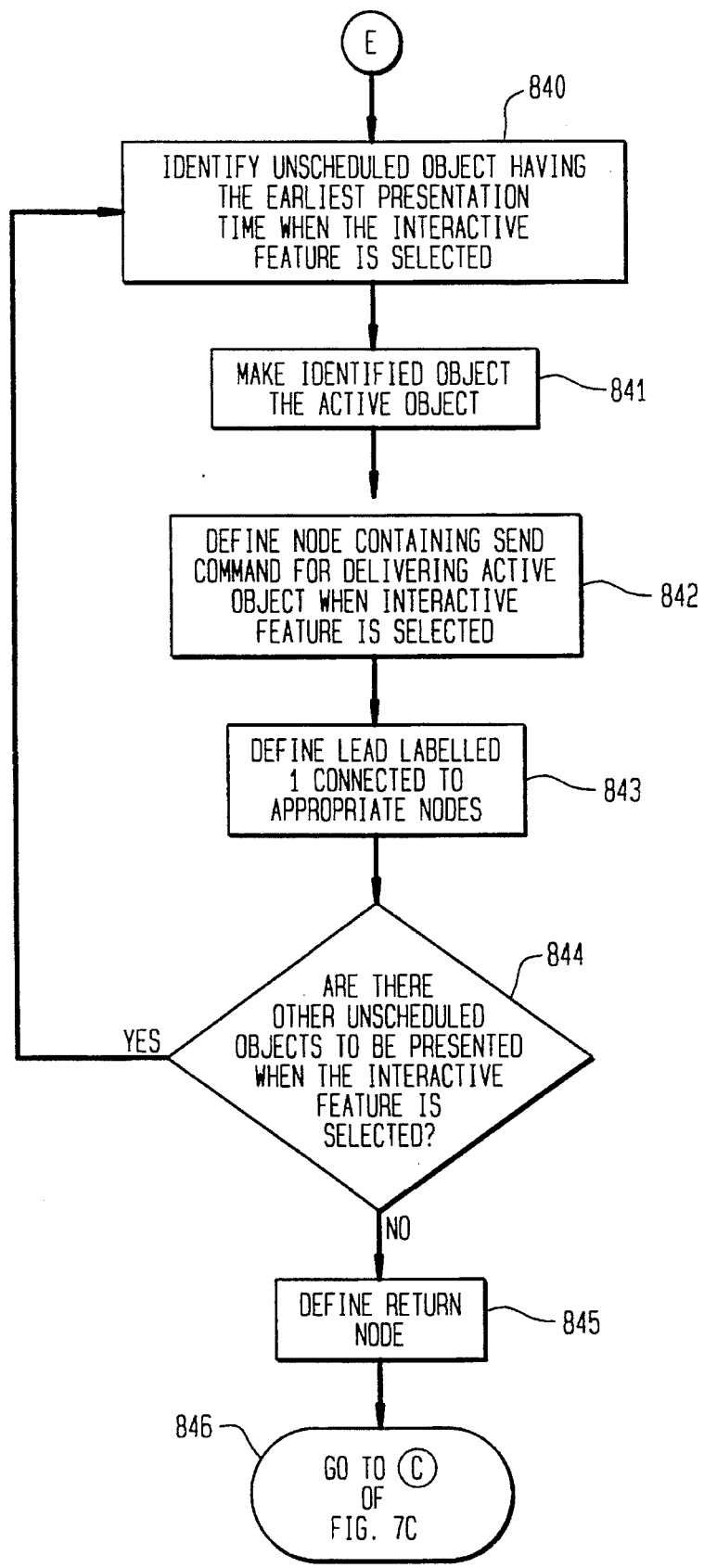

After scheduling the pre-delivery of Object 6 and the conditional delivery of Object 7, the delivery processor shifts back to scheduling the delivery of the undelivered object on Clock 1 having the earliest presentation time (See Step 846 of FIG. 7E and Steps 850 and 854 of FIG. 7C). In finding that Object 3 has the earliest presentation time, the presentation scheduler makes Object 3 the current object for scheduling. The presentation scheduler inspects the interaction table of the OMP and determines that the sidebar interactive feature is available for selection by the customer between the current time on Clock 1 ($t_1=6.2$ seconds) and the presentation time of Object 3 ($t_1=16$ seconds). However, the delivery processor also determines that the information needed to respond without delay to the customer's selection will have been delivered to the presentation processor.

Realizing that a customer's selection not might occur prior to the delivery of Object 3, the presentation scheduler includes in the delivery schedule, another lead from Node 3, lead 224. This lead is labelled 0, and accommodates the case where no message indicating the customer's selection is received at the presentation scheduler after delivery of Object 6. Lead 224 connects Nodes 3 and 4 in the delivery schedule, and Node 4 includes a send command for the delivery processor to deliver Object 3 with delivery start and end times of $t_1=6.2$ and 9.3 seconds, as shown in FIG. 6A. In addition, the presentation scheduler tracks the available memory at the presentation processor at memory counter 206, which would indicate 200 Kbytes of available memory after Object 3 is delivered.

Object 4 is scheduled in a manner similar to Object 3, resulting in lead 225, labelled 0, connecting Nodes 4 and 6. Node 6 includes a send command for delivering Object 4, with delivery start and end times of $t_1=9.3$ and 15.6 seconds, respectively, as shown in FIG. 6A. The memory counter 206 indicates that after delivering the 100 Kbytes of Object 4, the available memory at the presentation processor is zero. Scheduling of Object 4 also results in lead 226 labelled 1 and connecting Nodes 4 and 5.

In scheduling the delivery of Object 5, the presentation scheduler determines that, between the $t_1=9$ and $t_1=21$ seconds ($t_1=19$ second+2 seconds RTL), a message indicating a customer's selection of the interactive features may be received at the delivery processor, which message would invoke the delivery of Object 7. To accommodate this possibility, the presentation scheduler includes in the delivery schedule lead 227, labelled 1 and connecting Nodes 6 and 5. The presentation scheduler also determines that it cannot schedule Object 7 or Object 5 for immediate delivery after the delivery end time (15.6 seconds) of Object 4 since memory at the presentation processor is temporarily full (Step 820 of FIG. 7B). But the presentation scheduler determines that as of $t_1=21$ seconds, the presentation processor will have completed its presentation of Object 2, making available 50 bytes of memory, and its presentation of Object 4, making available 100 Kbytes of memory, and at that time, the presentation processor can accommodate Object 7 or Object 5. Therefore, to schedule the delivery of Object 5, the presentation scheduler generates Node 7, which is connected to Node 6 via lead 228 labelled 0, and which includes a send command containing a delivery start and end times of $t_1=21$ and 24.1 seconds, respectively (Step 827).

The scheduling of Object 5 completes the scheduling of all objects clocked under Clock 1, and the presentation scheduler will similarly schedule unscheduled objects clocked on other clocks (Step 851 of FIG. 7C) beginning with the object having the earliest presentation time and currently unscheduled for delivery. Therefore, the presentation scheduler treats Clock 2 as the active clock (Step 852) and determines if any unscheduled object clocked on Clock 2 should be scheduled for delivery. Since Object 6 has been scheduled for delivery at Node 3 and Object 7 has been scheduled for delivery at Node 5, the scheduling of all objects is complete and the delivery schedule is completed by inserting an End Node connected to Node 7 via lead 229 which is labelled 0 (Step 853). This operation marks the completion of the preprocessing of the OMP, and the preprocessed multimedia presentation is output at lead 250 of the preprocessor 200 and stored at preprocessed multimedia storage 300.

For purposes of illustrating our delivery method, we assume that customer 600-1 requests the multimedia presentation depicted in FIGS. 1B and 1C. This request is received at the customer store 606 of the presentation processor via the distribution network 500 and interface 602 of the presentation processor 600. This request is detected by the presentation controller 608 and transmitted to the delivery processor 400. At the delivery processor, the request is received at interface 402 and detected by the delivery controller 401.

Figure 8:
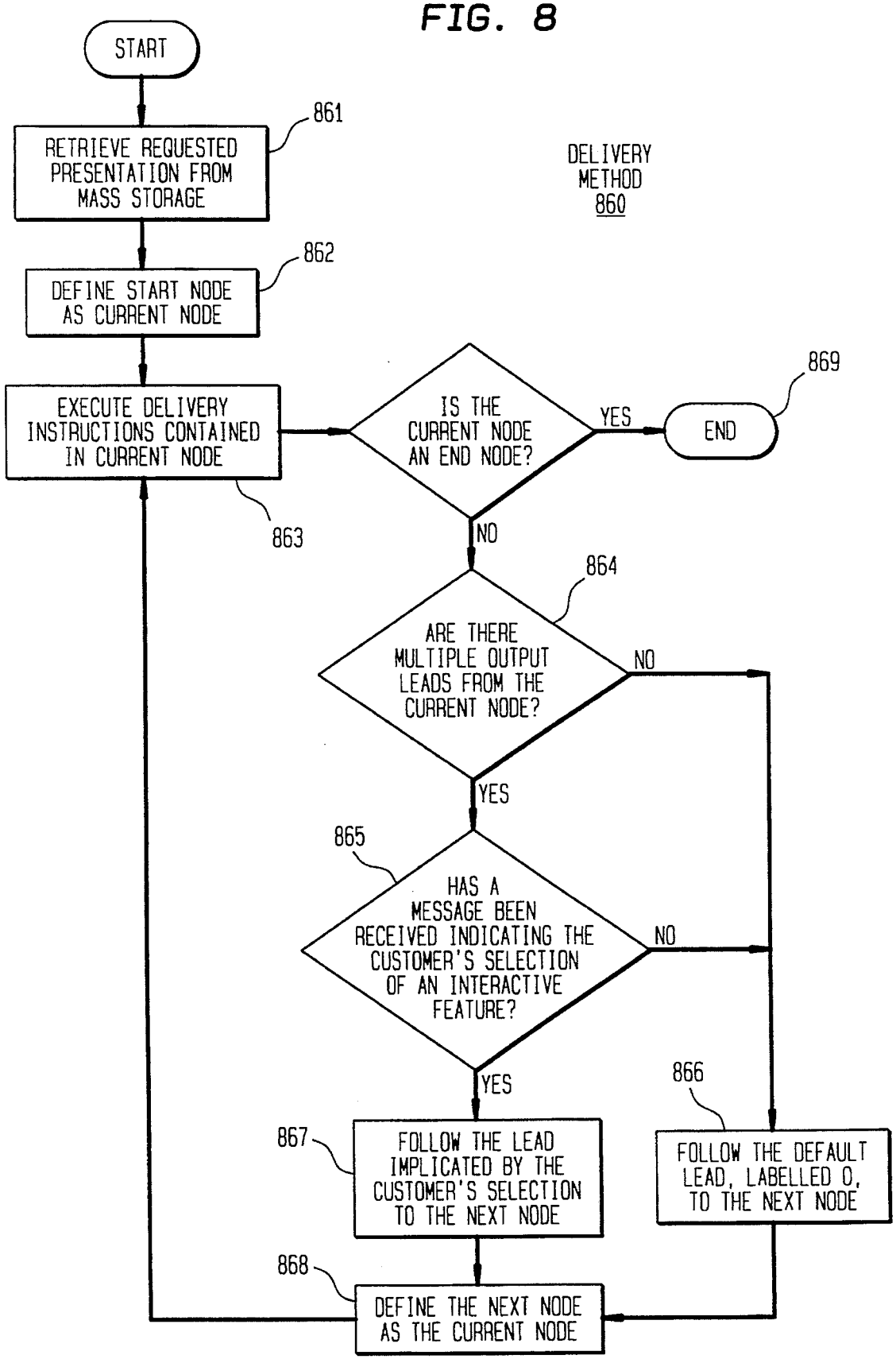
FIG. 8 depicts a flow diagram showing a representative embodiment of our delivery method in accordance with an aspect of our invention.

On receiving the customer's request for a multimedia presentation, the delivery processor retrieves from mass storage 300 the PMP which has been optimized for delivery over a distribution network and to a presentation processor having certain minimal characteristics (Step 861 of FIG. 8). FIGS. 6A and 6B show a delivery schedule of a preprocessed multimedia presentation which has been optimized for delivery over a distribution network operating at a minimum network bit rate of 128 kb/s and to a presentation processor having a maximum memory capacity of 250 Kbytes. Therefore, this preprocessed multimedia presentation may be delivered without interactive response time delays or gaps in the presentation over distribution systems operating at 128 kb/s (or faster) and to presentation processors having a maximum memory capacity of 250 Kbytes or larger. For purposes of discussion, we assume that the delivery processor, distribution network, and presentation processor meet such characteristics.

The delivery and presentation of the PMP shown in FIGS. 6A and 6B is performed as follows. Initially, the delivery controller of the delivery processor defines the Start (S) Node as the current node (Step 862) and executes delivery commands contained therein (Step 863). Based on delivery commands, the delivery controller makes Clock 1 active at the local delivery clock 406 which is initially set to $t_1=0$. In addition, the delivery controller sends, via interface 404, the interaction table of the presentation and a presentation command to the presentation processor.

Information delivered from the delivery processor to the presentation processor is received at interface 601 and held in memory store 610. The presentation controller 608 directs the interface to store presentation commands at store 604, objects at store 603, and the interaction table at store 605 (Step 901 of FIG. 9). On comparing the time on the local presentation clock ($t_1=0$) with the time contained in the presentation command contained in the Start Node ($t_1=0$) and finding that the presentation command is due for execution, the presentation controller executes the instructions contained therein, makes Clock 1 the active local presentation clock which is initialized to $t_1=0$, and waits 5 seconds prior to presenting the multimedia presentation to the customer.

After executing the delivery commands contained in the Start (S) Node, the delivery controller follows lead 220 to Node 1. On executing the delivery commands contained therein, the delivery controller delivers Object 1 and its associated presentation command from $t_1=0$ to 3.1 seconds.

At $t_1=5$ seconds, the presentation processor detects that the presentation command associated with Object 1 is due to be executed and presents this object via interface 602 to the customer (Steps 902 and 903 of FIG. 9). The presentation of Object 1 ends at $t_1=20$ seconds, and at that time, Object 1 and its associated presentation command are deleted from memory store 610 (Steps 904 and 905). Other presentation commands and objects are similarly executed and presented, respectively, and deleted from memory store 610 (Step 906). The presentation processor similarly compares the time on the local presentation clock 607 with the presentation time contained in each presentation command to determine which presentation commands are due for execution until each presentation command has been executed.

At the delivery processor, the delivery controller next follows lead 221 to Node 2 and delivers Object 2 and its associated presentation command at $t_1=3.1$ seconds over an infinitesimally small period of time. Advancing to Node 3 via lead 222, the delivery controller delivers Object 6 from $t_1=3.1$ to 6.2 seconds. Next, on encountering two output leads at Node 3 (Step 864 of FIG. 8), the delivery controller checks message store 402 to determine if a message from the customer indicating the selection of the interactive feature has been received (Step 865). We assume for illustrative purposes, that no such message is detected. Therefore, the delivery controller follows lead 224 labelled zero to Node 4, and deliver Object 3 from $t_1=6.2$ to 9.3 seconds (Step 866). Two output leads are again encountered at Node 4, and message store 402 is similarly checked.

For illustrative purposes, we assume that at $t_1=9$ seconds, a customer's selection of the interactive feature is detected by the presentation controller 608 at customer store 606 at the presentation processor. After checking the interaction table of store 605, the presentation controller determines that the interactive feature is enabled at $t_1=9$ seconds, and sends a message to the delivery processor indicating the customer's selection of the interactive feature (Steps 907 and 908 of FIG. 9).

At the delivery processor, on encountering the output leads of Node 4, the delivery controller will check message store 402 and detect a message indicating the customer's selection of the interactive feature (Step 865 of FIG. 8). Therefore, the delivery controller follows lead 226 to Node 5 (Step 867) and delivers Object 7 to the presentation processor from $t_2=9.3$ to 15.6 seconds (Steps 868 and 863). After executing the delivery command at Node 5, the delivery controller follows lead 231 to the Return (R) Node, which instructs the delivery controller to return in the delivery schedule to the output of Node 4. The delivery controller then follows lead 225 to Node 6 and delivers Object 4 from $t_1=9.3$ to 15.6 seconds and then lead 228 to Node 7 and delivers Object 5 from $t_1=21.0$ to 24.1 seconds. Finally, the delivery controller follows lead 229 to the End (E) Node, where it is notified that the delivery of the presentation is completed.

CONCLUSION

We have described a system and method for preprocessing and delivering multimedia presentations such that delays due to interactive response time is virtually eliminated. Finally, the above-described embodiments of the invention are intended to be illustrative only. Numerous alternative embodiments of the present invention may be devised without departure from the spirit and scope of the following claims.

What is claimed is:

1. A system for preprocessing and, in real time, delivering an interactive multimedia presentation to a customer, wherein said multimedia presentation includes presentation commands and associated multimedia objects and offers at least one interactive feature to the customer and wherein each presentation command has an associated presentation time, said system comprising:

a presentation processor for playing out objects of the presentation to the customer according to the presentation commands and the customer's selection of the interactive feature;

a distribution network having a bit rate;

a delivery processor, connected to said presentation processor via said distribution network, for delivering presentation commands and associated multimedia objects to said presentation processor, said delivery processor and said presentation processor having a round trip latency thereassociated; and a preprocessor including means for receiving as inputs an original multimedia presentation, including multimedia objects and presentation commands, and presentation technology parameters including said round trip latency between said delivery processor and said presentation processor and said bit rate of said distribution network, and means for generating, based upon said inputs, a preprocessed multimedia presentation including a delivery schedule which contains delivery commands to be executed by said delivery processor for delivering each presentation command and associated object to said presentation processor prior to the presentation time associated with the presentation command, wherein said preprocessor generates said delivery schedule such that upon the customer's selection of the interactive feature, presentation commands and associated objects to be executed in response to the customer's selection are available at said presentation processor to preclude delays and gaps in playing out the presentation to the customer.

2. The system of claim 1 for preprocessing and, in real time, delivering an interactive multimedia presentation to a customer further comprising mass storage located between said preprocessor and said delivery processor for storing said preprocessed multimedia presentation generated at said preprocessor.

3. The system of claim 1 for preprocessing and, in real time, delivering an interactive multimedia presentation to a customer, wherein said presentation processor has a memory capacity and said inputs to said preprocessor further includes said memory capacity of said presentation processor.

4. The system of claim 1 for preprocessing and, in real time, delivering an interactive multimedia presentation to a customer, wherein said delivery processor comprises a delivery controller which controls the retrieval of said preprocessed multimedia requested by the customer and executes delivery commands contained in said presentation delivery schedule of said preprocessed multimedia presentation.

5. The system of claim 4 for preprocessing and, in real time, delivering a multimedia presentation to a customer, wherein said delivery controller has a service time (ST), which is a time for said delivery controller, once receiving a message from the presentation processor indicating the customers selection of the interactive feature, to respond to said presentation processor, and said distribution network has a propagation delay (PD), which is a time for said message to travel from said presentation processor to said delivery processor, and wherein said delivery processor further comprises, means for storing messages received from said presentation processor and a presentation technology parameter generator connected to said delivery controller for generating said round trip latency to be input to said preprocessor, said generator requesting from said distribution network said propagation delay (PD) of said distribution network and utilizing said propagation delay (PD) and said service time (ST) of said delivery controller to generate said round trip latency (RTL) as follows:

RTL (seconds)=2(PD)+ST.

6. The system of claim 5 for preprocessing and, in real time, delivering a multimedia presentation to a customer, wherein said delivery processor further comprises: means for storing said preprocessed multimedia presentation retrieved by said delivery controller; and means for storing messages received from said presentation processor.

7. The system of claim 6 for preprocessing and, in real time, delivering a multimedia presentation to a customer, wherein said delivery processor further comprises:

a first interface connected to said preprocessor for receiving said preprocessed multimedia presentation retrieved by said delivery controller and for sending said RTL generated at said presentation technology parameter generator to said preprocessor; and a second interface connected to said presentation processor for receiving messages from said presentation processor and transmitting presentation commands and associated multimedia objects to said presentation processor.

8. The system of claim 1 for preprocessing and, in real time, delivering an interactive multimedia presentation to a customer, wherein said presentation processor comprises:

means for storing presentation commands and objects received from said delivery processor;

means for collecting and storing messages received from said customer;

a presentation clock for tracking the local time at said presentation processor; and a presentation controller connected to said presentation clock for comparing said local presentation time to the presentation time associated with each presentation command to identify presentation commands due for execution and presenting objects to the customer as instructed in the presentation commands.

9. The system of claim 8 for preprocessing and, in real time, delivering a multimedia presentation to a customer, wherein said presentation controller deletes each presentation command and its associated object from said memory means once its associated object has been presented and forwards a message to said delivery processor if a message is detected at said collecting and storing means indicating the customer's selection of the interactive feature.

10. The system of claim 9 for preprocessing and, in real time, delivering a multimedia presentation to a customer, wherein said presentation processor further comprises:

a first interface, connected to said presentation controller, for communicating with said delivery processor and a second interface, connected to said presentation controller, for communicating with the customer.

\* \* \* \* \*